United States Patent
Mayer et al.

(10) Patent No.: US 9,491,913 B2
(45) Date of Patent: Nov. 15, 2016

(54) SYSTEM AND METHOD FOR MORE EFFICIENT AUTOMATIC IRRIGATION BASED ON A LARGE NUMBER OF CHEAP HUMIDITY SENSORS AND AUTOMATIC FAUCETS

(75) Inventors: Yaron Mayer, Jerusalem (IL); Al J. C. Baur, Kibbutz Ramat Hashofet (IL); Haim Gadassi, Jerusalem (IL)

(73) Assignee: Batya Barhon Mayer, Jerusalem (IL)

( * ) Notice: Subject to any disclaimer, the term of this patent is extended or adjusted under 35 U.S.C. 154(b) by 1355 days.

(21) Appl. No.: 12/259,918

(22) Filed: Oct. 28, 2008

(65) Prior Publication Data

US 2009/0145985 A1      Jun. 11, 2009

Related U.S. Application Data

(63) Continuation-in-part of application No. 10/937,750, filed on Sep. 10, 2004, now abandoned, which is a continuation-in-part of application No. PCT/IL03/00195, filed on Mar. 10, 2003.

(60) Provisional application No. 60/374,312, filed on Apr. 16, 2002, provisional application No. 60/403,610, filed on Aug. 12, 2002, provisional application No. 60/417,677, filed on Oct. 7, 2002.

(30) Foreign Application Priority Data

Mar. 10, 2002   (IL) .......................................... 148586
Oct. 27, 2003   (CA) ...................................... 2446843

(51) Int. Cl.
*B05B 15/00*      (2006.01)
*A01G 25/16*      (2006.01)
*A01G 27/00*      (2006.01)

(52) U.S. Cl.
CPC .......... *A01G 25/167* (2013.01); *A01G 27/005* (2013.01)

(58) Field of Classification Search
CPC ... A01G 25/023; A01G 25/165; A01G 25/06
USPC .............. 239/145, 450, 542, 269, 63, 67–69
See application file for complete search history.

(56) References Cited

U.S. PATENT DOCUMENTS

| | | | | |
|---|---|---|---|---|
| 3,036,783 A | * | 5/1962 | Hansen | 239/548 |
| 3,672,571 A | * | 6/1972 | Goodricke | 239/145 |
| 4,045,293 A | * | 8/1977 | Cooksley | 203/10 |
| 4,162,041 A | * | 7/1979 | Hane | 239/266 |
| 4,168,799 A | * | 9/1979 | Turner | 239/145 |
| 4,769,277 A | * | 9/1988 | Meunier | 442/320 |
| 4,858,377 A | * | 8/1989 | Oglevee et al. | 47/17 |

(Continued)

*Primary Examiner* — Davis Hwu

(57) ABSTRACT

The present invention provides an irrigation system with cheap humidity sensors and cheap automatic faucets preferably by using at the end nodes of the system low water pressure, so that much less force is needed to open and close the local waterway, and then either using simple electrical valves that do not require engines, or using for example mechanical sensors based on a bi-material of two or more materials which expand differently when they become wet, thus converting the difference of the expansion into convenient movement. Another possible variation, instead of mechanical sensors and valves, is to use for example a preferably synthetic material that tends to behave like a normal root preferably at the edge of each side channel, so that the "root" counter-balances the water supply and reaches equilibrium with it when the soil becomes wet enough, based preferably on asymmetric capillary materials.

16 Claims, 6 Drawing Sheets

(56) References Cited

U.S. PATENT DOCUMENTS

| | | | |
|---|---|---|---|
| 5,641,915 A * | 6/1997 | Ortiz et al. | 73/861.69 |
| 5,794,848 A * | 8/1998 | Nunn et al. | 239/63 |
| 6,036,104 A * | 3/2000 | Shih | 239/63 |
| 6,039,267 A * | 3/2000 | Orsi | 239/63 |
| 6,240,336 B1 * | 5/2001 | Brundisini | 700/284 |
| 6,394,368 B1 * | 5/2002 | Hintz | 239/542 |

* cited by examiner

Side view

Top view

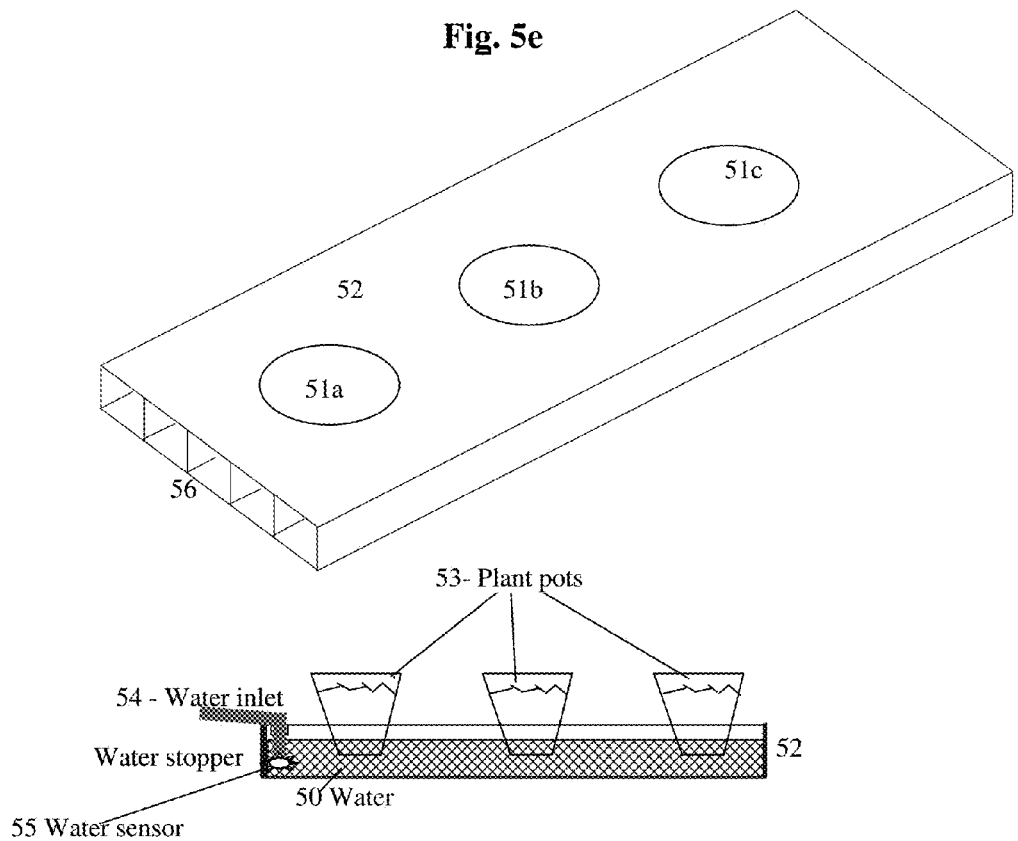
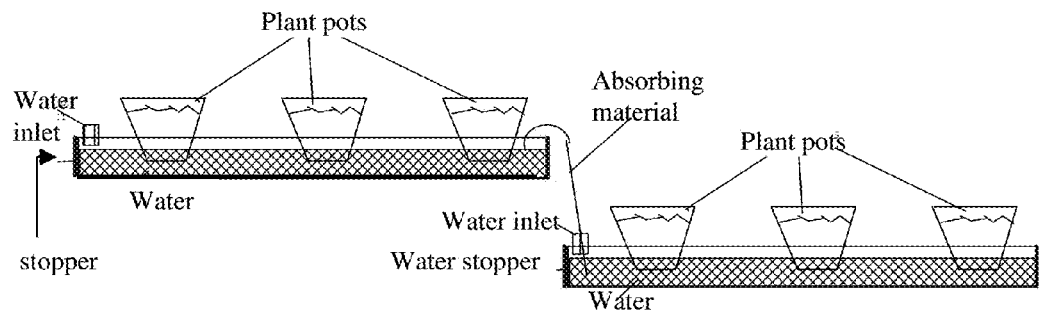

SYSTEM AND METHOD FOR MORE EFFICIENT AUTOMATIC IRRIGATION BASED ON A LARGE NUMBER OF CHEAP HUMIDITY SENSORS AND AUTOMATIC FAUCETS

This patent application is a Continuation-In-Part of U.S. application Ser. No. 10/937,750 of Sep. 10, 2004, which is a CIP of PCT application PCT/IL 03/00195 of Mar. 10, 2003, hereby incorporated by reference in its entirety (which claims priority from Israeli application 148586 of Mar. 10, 2002, hereby incorporated by reference in its entirety, and also claims benefit and priorities from the following US provisional applications, hereby incorporated by reference in their entireties: 60/374,312 of Apr. 16, 2002, 60/403,610 of Aug. 12, 2002, 60/417,677 of Oct. 7, 2002), and which also claims priority from Canadian application 2,446,843 of Oct. 27, 2003.

Therefore, priority and benefit is claimed from all of the above mentioned applications, and all of them are hereby incorporated by reference in their entireties.

BACKGROUND OF THE INVENTION

Field of the Invention

The present invention relates to automatic irrigation with humidity sensors, and more specifically to a system and method for more efficient automatic irrigation based on a large number of cheap humidity sensors and cheap automatic faucets, which can optimize the use of water so that less water is wasted and each plant or group of plants can get the optimal amount of water that it needs. Various solutions shown in the patent can be used for example for gardens, agriculture, and flowerpots (for example at homes or in plant nurseries).

Background

The most efficient water irrigation systems today for gardens and/or fields typically use dripping systems that release drops of water at certain distance intervals for example for about 30-60 minutes per day (for example every 30-100 cm of the pipe there is dropper that releases typically 2 litters of water per hour) and are typically controlled by timers that start or stop the water in the main pipes. However, although this is in general more efficient than systems that do not use droppers, this can still be far from optimal since it does not take into account different needs for each area, depending for example on the individual needs of each plant, heterogeneity of soil type, different amount of Sun or shade in each part of the garden or field, different number of plants in each area, etc. In other words, irrigation systems based on pipes with droppers, typically controlled only with a timer, which are the most common form of irrigation used today, suffer from one very basic weakness, which is that they have no feedback, so they are in essence working blindly. Another problem, which is related to the above lack of feedback, is that there is no efficient way of self-monitoring, so typically, since the system is not aware of its own condition, it also cannot report problems, such as for example breach of main pipes that can cause flooding, or, in the other direction, various pipes or side-channels becoming blocked. Therefore, these systems typically can still waste a lot of water on the one hand and neglect many plants on the other hand, so that some plants get too much water and others get too little water. For example, a raspberry plant or a weeping willow tree typically needs much more water than other plants. Similarly, to the best of our knowledge, there is no simple solution for efficient cheap automatic irrigation of plants in multiple flowerpots that can be used easily with ordinary flowerpots, for example in homes and in plant nurseries that sell plants, except for inserting a pipe in each flowerpot and opening and closing large groups of them by time control, which suffers from all the drawbacks described above. British patent 2281182 describes a closed container of water covered with a capillary mat on its top on which flowerpots are placed. However, this can reduce the efficiency of water uptake compared to placing the flowerpots directly in a water-filled bottom dish, and also the container is filled manually. Many patents describe the use of a water container coupled to a flowerpot that automatically lets the flowerpot draw water when needed, but only few of them, such as U.S. Pat. Nos. 5,918,415, 4,083,147, 4,546,571, and 4,557,071 describe a truly automatic refilling of the container. However, even those typically use a complex configuration that can't be used with normal flowerpots or requires a complex control valve. Anyway, in practice in homes and even in many plant nurseries the plants are still typically watered manually. Therefore, many plants either get too much water, or are neglected and dry out.

Saving water is very important, since according to the World Watch 2000 report we are depleting the planet's water resources at the rate of 109 billion gallons of water per day. Many areas in the world already suffer shortages of water, and others will suffer from it in the coming years. Israel, for example, is now in a critical stage of water shortage, with the Kineret sea's water level already at a critically low level. Therefore, in addition to more desalination of water, more efficient irrigation systems are essential for our survival on this planet.

In order to improve the efficiency of the automatic irrigation systems, humidity sensors are needed, however, although many types of humidity sensors exist, they are typically quite expensive (typically between $150 to even thousands of dollars), and automatic faucets are also typically relatively expensive (costing typically at least a few dozens of dollars each, since they typically contain an electric motor, good insulation between the water and the electrical parts, etc.), so they are not used for controlling more optimally the amount of water for each individual plant or for each small group of plants or small area. Also, many of the known methods for humidity sensing suffer from various limitations, such as for example limited range of response, sensitivity to changes in the salinity of the ground, sensitivity to changes in temperature of the ground, etc. So clearly cheaper good sensors and cheaper automatic valves are needed. Such a cheap solution would also be very attractive to customers and encourage them to use it, since a cheap enough system that saves a lot of money on watering per month while also improving plant growth, can preferably pay itself back in a few months or even less and start actually saving money for the customer.

SUMMARY OF THE INVENTION

The present invention tries to solve the above problems by providing much cheaper humidity sensors that are still quite reliable and also much cheaper automatic faucets, so that preferably each plant or (preferably small) group of plants can be automatically watered by an individual set of moisture sensor and automatic faucet. The attainment of cheaper but reliable humidity sensors is preferably done by using durable cheap sensors that do not degrade quickly and are preferably immune to or able to cheaply compensate for changes in temperature and in salinity. The attainment of cheap automatic faucets is preferably done by using at the end nodes of the system low water pressure, so that much less force is needed to open and close the local waterway, and then either using much simpler electrical valves that do not require engines, or circumventing the need for electrical valves altogether, by using mechanical sensors that control a mechanical valve or directly exert pressure on a flexible pipe, as explained below. Another possible variation, instead of mechanical sensors and valves, is to use for example some chemical control that takes advantage of the behavioral tendency of the water itself, so that for example the water is supplied by a device similar to a plant's roots, except that it works in reverse, so that water is supplied at low pressure to the artificial "root" from above, and the "root" adds water to the earth instead of absorbing it, and stops supplying the water to the earth when the earth has reached a certain humidity level, which automatically creates an equilibrium for example in osmotic pressure between the artificial root and the earth. A similar variation of this is adding a preferably synthetic material that tends to behave like a normal root preferably at the edge of each side channel (and/or in other places), so that the "root" counter-balances the water supply and reaches equilibrium with it when the soil becomes wet enough, based preferably on asymmetric capillary material or materials, as shown for example in FIG. 6. Another possible variation is to use for many plants or at least for each sub-group of them a common water tank like a Niagara, but air-tight, and one or more pipe leads from the common tank to the plants where preferably each side branch for example goes preferably more or less vertically into the soil in a flowerpot or (if it is in a garden or field) into the soil near one or more plants, so that each such side-branch has a humidity control based on air passage, as explained in FIG. 7.

The solution for flowerpots is similar, except that the sensing can be done even more efficiently and even more cheaply, and also the control of the watering itself can be done more efficiently and more cheaply, by taking advantage of certain features of flowerpots, as explained below. Therefore, the solution or flowerpots can be regarded also as a smart-home gadget, since it uses smart and cheap automation to both save work and time and to save water.

In gardens and agricultural fields preferably one or more main pipes are used with sufficient water pressure of for example 1 or more atmospheres, and each pipe preferably extends into smaller channels that go for example sideways, each preferably with a much lower pressure. This way, the valve that is needed to control each of these small channels needs much less force and therefore can be much cheaper than an ordinary electronic faucet. The reduced pressure can be created for example by using long twisted small conduits at or before each side-channel that easily lower the water flow (such as for example in the pipes by Queen-Gil), which is very cheap and efficient. Another possible variation is using for example a set of preferably small water collectors that work like a toilet's Niagara (preferably one for each side channel), or using mechanical pressure reducers (however these last 2 options are less efficient). This general configuration is shown in FIGS. 1 & 1*a-b*. The sensing can be for example mechanical, so that for example a sponge or wood or hair (or other material that changes it shape when it becomes wetter or drier) closes or opens a valve or for example applies pressure to a flexible pipe for example directly by its own mechanical change of shape or indirectly through activating an electrical element (Preferable solutions for this are shown for example in FIGS. 2*a-i*). One of the most interesting of these variations is mechanical sensors based on a bi-material of two or more materials which expand differently when they become wet, thus converting the difference of the expansion into convenient movement. Or the sensing and control can be done electrically, but preferably in very cheap and efficient ways, as described below (Preferable solutions for this are shown for example FIGS. 3*a-d* & 4*a-c*), or the sensing and control can be based on physical and/or chemical tendencies of the water itself, preferably by using asymmetric and/or irregular and/or strong capillary material or materials, as explained above and in FIG. 6.

In flowerpots (plant pots), the solution can be even more efficient, because of the very fact that the plant and its earth are isolated and typically placed over a bottom dish that prevents excess water from running away. This opens up a few interesting possibilities that are harder to accomplish in gardens and fields: The sensor can be placed preferably on the bottom of the bottom dish, so that it merely has to sense if it is in water or in the air, which is much easier than sensing the level of humidity in the earth, since it does not have to face all the problems described above. This can be done for example by a simple electrical circuit that is closed when it is in water, or for example by a simple preferably small element with a floating part, that preferably moves up when there is water in the dish and down when there is no water or less water and opens or closes a valve mechanically or electrically. This on/off method is free of all the problems described above, and also is optimal in the sense that the earth in the flowerpot is always kept at more or less maximum humidity, and yet it is very efficiently since the reserve water is always kept at the bottom dish, instead of going down deeper into the ground, as it would do in a garden or in a field. The actual watering of the flowerpot is preferably done by letting the sensor control a valve on a pipe that enters or comes near to the flowerpot soil from above. This ensures that the water will go through the soil from the top down before it reaches the dish. Another possible variation is that the water pipe drops water for example directly into the bottom dish, which has the advantage of making the device even simpler, and due to capillary action, the water is absorbed in the soil anyway even if it comes only from below. However in this case, preferably there are more holes and/or larger holes at the bottom of the flowerpot. Another possible variation is the use these features in combination with using each dish in sharing with more than one flowerpot, for example by creating a round or square large area (for example like a large bath) in which the flowerpots are together side by side, or for example using an elongated dish that supports many flowerpot next to each other in a line. In these variations preferably the dish is balanced horizontally, so that the water is more or less evenly spread around it. This way, preferably one sensor is enough for the entire dish, and if the variation of watering the dish directly is used, than also preferably only one water supply and one valve is needed for the dish. This way automatically each plant that needs more water absorbs more water from the common pool into itself and therefore into its soil, and as long as there is sufficient water in the common dish and yet the water does not overflow, no plant is underwatered and no plant is overwatered, even for different types and sizes of plants, different soil types, etc. Also, this can lead to much more optimal conditions for plant growth, so plant nurseries can make more money because the plants grow bigger and faster, so by the time they sell them they can get a better price for them. The elongated dish variation has the advantage that it's more practical and more easy to balance, and also allows easy access to every plant, whereas a dish extended in two dimensions would make it hard to access the inner flowerpots without stepping into the dish. This can be used very easily for example in balconies in homes, or in plant nurseries. An array of such large multi-plant dish rows in a plant nursery is shown for example in FIG. 5f. Another possible variation is to use for example dishes that are closed on the top and have for example holes in the top part for inserting the flowerpots. This has the further advantage that less water is lost due to evaporation directly from the dish. This is a major advance over the current state-of-the art of methods of irrigating plants in flowerpots. Another possible variation is to connect a number of such preferably elongated bottom dishes for example with side pipes, so that one set of sensor and water supply can take care of more than one dish. Another possible variation is to combine the above for example with time control, so that for example the dishes are kept with water in them only for example for a few hours each day. This gives more flexibility in the moisture content in the soils, so that lower moisture levels can also be used. Another possible variation is to use these multi-flowerpot dishes in any of the above configuration with manual filling of water in the dish, which is of course less efficient then automatic control, but still, if for example a plant nursery is divided into a number of rows, each with an elongated dish that serves for example dozens of plants, this is already much more efficient than the current state of the art, since all the workers have to do is water each of the elongated dishes, which is much more efficient and easy than having to water each individual plant, and yet each individual plants gets more optimal conditions than by the normal method of watering each plant individually. Of course, various combinations of the above and other variations can also be used. Preferable variations of these solutions are shown for example in FIGS. 5a-g. Also, the same methods or principles described for gardens and fields can be also used with flowerpots, however that could be less efficient, except in the case of asymmetric capillary materials, which might be the best method also for flowerpots.

Another possible variation is to use similar principles like those of the solutions for the flowerpots—also for gardens and/or fields, for example by inserting (preferably more or less horizontally) a water-blocking material (such as for example a preferably strong plastic or nylon) below the plants, for example by removing 1-2 meters of earth, adding the material, and adding back the earth on top, preferably before planting the plants. The blocking material is preferably also hard enough so as not to be distorted in shape too much by the pressure from above and by the contours of land and rocks below, and preferably has also for example vertical walls around itself, so as to create one or more large pool isolating the earth with the plants above that pool from the rest of the earth below and around. This way, although the humidity sensors have to work more like in the solutions described above for gardens and fields than the special solutions that can work with water dishes with flowerpots, still the usage of water can be much more efficient since the earth in the area of the plants can be kept at higher humidity levels with less water than in a normal garden or field where excess water can always escape further below into the ground. This can work even if the blocking material does not seal the area hermetically but only significantly reduces the rate in which water can escape away downwards. Like with the flowerpot dishes, the water blocking material can also be for example based on an array of elongated structures that look like bottom-halves of large pipes, that are inserted into the ground and covered with a layer of earth upon which for example vegetables or other agricultural products can be grown more efficiently.

Another possible variation, which can be applied in combination with any of the other variations, is to supply the plants with the same water supply system, also with other nutrients in addition to the water, such as for example liquid fertilizers and/or minerals, and/or for example air or CO2 or oxygen (for example by using Soda water with various degrees of CO2 melted in the water) in order to further help stimulate the plant's growth. Such additional materials can be added for example all the time in the desired quantities as a certain percent of the water, and/or part of the time with the aid of an automatic time schedule, and/or together with additional sensing (for example when the naturally occurring electrical potential in the earth indicates too low salinity, or when there is indication of too little air in the ground, and/or for example depending on the level of humidity, etc.). The addition of air or CO2 or other gases is especially important, since, apart from speeding up plant growth, it can also protect its roots from rotting, since the main cause for rotting in roots is the lack of air when they are immersed too much in water. This addition of gases such as for example air or Oxygen or CO2 can be used also in combination with hydrophonic or hydrostatic irrigation methods, since the main problem that limits the use of such methods to only a limited variety of plants is that in many plants the roots rot under such conditions due to lack of air. However, adding for example air or Oxygen instead of CO2 is more preferable, since the absorption of CO2 in water makes them acidic. Since (unlike leafs) the roots need Oxygen, adding Oxygen to the water supply can help the plant thrive even at levels of 100% humidity.

Another possible variation, which can be applied in combination with any of the other variations, is adding a feedback system for automatically reporting problems for example to a central control unit, such as for example flooding or blockages. One way of accomplishing this is by allowing for example each valve or sensor at the side channels to report back the approximate amount of water passed by it and/or the percent of time it remained open and/or for example to report significant changes in conditions, such as for example suddenly finding much more humidity in a certain area, or finding that the area remains dry despite the attempts of the sensor to open the valve. (However, increase in humidity can also be caused by rain for example so this is preferably reported to the user by the central control only if it deviates significantly from other sub-areas). However this can make the system a little more expensive. Another possible variation is to use a hierarchy of more than 2 levels, so that there are not only main pipes and side channels but also one or more intermediary levels, and preferably intermediary junctures are responsible for indication and/or reporting of such problems, which is cheaper to implement, since in this case only these junctures have to be smarter. For these junctures the more preferred variation is that they simply have a cheap water-meter and report back to the center and/or to the main supply of each main pipe the approximate amount of water consumed per time period, and/or each main pipe for example has its own water-meter and reports this, and then either the human operator or a preferably cheap processor at the center can easily notice if there are significant deviations.

BRIEF DESCRIPTION OF THE DRAWINGS

FIGS. 1*a-b* show a few preferable variations of methods for lowering the pressure at the side channels.

FIGS. 2*a-i* show a few preferable examples of mechanical sensing based on materials that change their shape when they become wetter or drier and thus efficiently close or open or gradually move a cheap and efficient valve electrically or mechanically and/or exert pressure for example on a flexible pipe.

FIGS. 5*a-h* show a few preferable examples of cheap and efficient sensors and water supplies that take advantage of the bottom dishes of flowerpots.

IMPORTANT CLARIFICATION AND GLOSSARY

All these drawings are just exemplary drawings. They should not be interpreted as literal positioning, shapes, angles, or sizes of the various elements. Throughout the patent whenever variations or various solutions are mentioned, it is also possible to use various combinations of these variations or of elements in them, and when combinations are used, it is also possible to use at least some elements in them separately or in other combinations. These variations are preferably in different embodiments. In other words: certain features of the invention, which are described in the context of separate embodiments, may also be provided in combination in a single embodiment. Conversely, various features of the invention, which are described in the context of a single embodiment, may also be provided separately or in any suitable sub-combination. The word "flowerpot" as used throughout the text, including the claims, can mean any type of pot or container for growing plants. The words "automatic faucet" or "automatic valve" as used throughout the text, including the claims, can mean generally any type of automatic control, including one with no moving parts, such as for example when using asymmetric capillary materials.

DETAILED DESCRIPTION OF THE PREFERRED EMBODIMENTS

All of descriptions in this and other sections are intended to be illustrative examples and not limiting.

Figure 1:
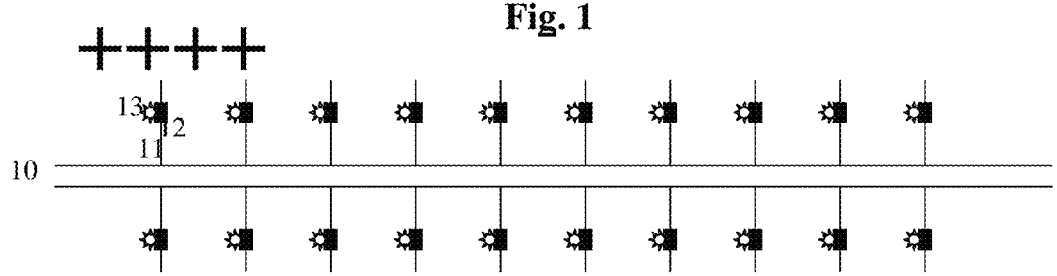
FIG. 1 is a top-view illustration of a preferable general configuration of a main pipe with sufficient water pressure which extends into smaller channels with a preferably much lower pressure that are preferably each controlled by its own cheap humidity sensor and cheap valve.
Figure 1:
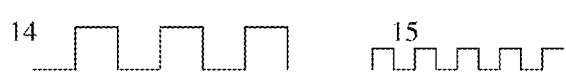
Figure 1:
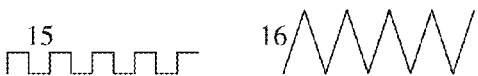

Referring to FIGS. 1 & 1*a-b*, we show a top-view illustration of a preferable general configuration of a main pipe (10) with sufficient water pressure (such as for example 1 or a few atmospheres) which extends into smaller channels that go for example sideways (11) with a preferably much lower pressure that are preferably each controlled by its own cheap humidity sensor (13) and cheap valve (12). Each such side-channel can go for example to an individual plant, or to a preferably small area surrounding a number of plants, as desired by the user. This way, the valve (12) that is needed to control each of these small channels (11) needs much less force and therefore can be much cheaper than an ordinary electronic faucet (solenoid), which typically contains a motor and is designed to deal with much higher pressures. Preferably the sensors are not too close to the end of the side channel in order to sense the real humidity in the near earth and not to be influenced too much by immediate feedback of humidity at the end of the side channel. Of course other shapes and angles can also be used (and the channels can for example go only to one side instead of the two sides), and in each garden or field preferably more than one main pipe is used. Another possible variation is to use for example a hierarchy of more than 2 levels, so that between main pipes and side channels there can be also 1 or more intermediary level pipes, preferably with intermediate water pressure. The reduced pressure can be created for example by using long twisted small conduits at or before each side-channel that easily lower the water flow (such as for example in the Queen-Gil pipes, except that the side branches are preferably at larger distances from each other than the 10 cm interval in the Queen-Gil pipes). The combination of higher pressure in each main pipe and much lower pressure in each side-channel also solves the problem of independence between the channels: This way each sensor can decide to open or close its valve independently of the others, without suffering from lower or higher pressure depending on the decisions of its neighbors, since even if all of the sensors open their valves at the same time and the water flow is for example 0.5 litters per hour from each side channel, the total loss of pressure after a hundred meters can be for example just a few percents. Another possible variation is using for example at or before each smaller channel (or each group of channels) a preferably small water collector that works like a toilet's Niagara (except that when released the water is allowed to go out preferably slower than when a toilets' Niagara is flushed). In this case it is also possible to lower the pressure for example also at the beginning of the main pipe (by a similar larger Niagara type container or by other pressure-lowering devices) because the small collectors an also solve the problem of independence between different channels so that each one does not feel a different pressure if the others are open or closed. FIG. 1*a* shows a labyrinth of thin water conduit before or at each side-channel with right angles like a square wave (14 or 15), which can extend for example for a few dozen such cycles, like in Queen-Gil pipes (where after every certain distance there is a labyrinth on the side, leading to 4 small holes beside each other on the side, except that preferably there is only 1 exit for each such labyrinth). FIG. 1*b* shows a labyrinth with much sharper angles (16), which can reduce the water flow with even less cycles. (As explained above in clarification section, for example the labyrinth with sharper angles, or any other feature in this invention, can also be used independently of any other features of this invention). Each valve can be for example attached a small pipe at the end of the labyrinth conduit, or for example the exit side-pipe expends to a wider pipe before the valve, in order to translate the lower water flow more directly into lower pressure. The sensing can be for example mechanical, so that for example a sponge or wood or hair (or other material that changes its shape when it becomes wetter or drier) closes or opens a valve for example directly by its own mechanical change of shape or indirectly through activating an electrical element (Preferable solutions for this are shown for example in FIGS. 2a-i), or the sensing and control can be done electrically, but preferably in very cheap and efficient ways, as described below (Preferable solutions for this are shown for example FIGS. 3a-d). If the control of the valves is electrical, preferably there is no need for central control by a main computer, so that each sensor preferably controls directly the valve coupled to it, so that preferably only 2-3 power lines are needed along the main pipes. However, preferably the main control of each main pipe (or each group of main pipes, or for example any control of pipes or subgroups of pipes or subgroups of side-channels) can also override the individual sensors for example by issuing a command to force all the valves (or a large group of valves) to close no matter what their sensors say (for example by stopping the main water supply and/or by electrical command to all the valves), or forcing all the valves (or a large group of valves) to open (for example by increased main water pressure or by electrical command to all the valves to open no matter what their sensors say). This can be used for example for creating combinations between sensor control and centrally controlled time schedules, which can be for example on the level of On/Off, or by increasing or decreasing the overall water supply. For avoiding blockings in the smaller conduits because of accumulating dirt, such as for example sand or other materials, preferably good pre-filters are used for example at the beginnings of the main pipes, that can remove such elements as much as possible, for example in a way similar to the pre-filters that are used before desalination devices. Another possible variation is that once in a while a significantly larger water pressure is used for a short burst or bursts (for example for a few minutes each day, or a few minutes or seconds each hour), in order to help push away such elements that might clog the small conduits or side channels during the slow flow. Preferably the small conduits and their valves are strong enough to stay intact even with the stronger pressure, and preferably during this pressure bursts all the valves become open even if their sensor did not tell them to open, so that the sensors are preferably temporarily overridden. This can be accomplished either mechanically by the increased pressure itself, or if the valves are electrically controlled, by issuing a central command to all of them to open, thus overriding the local controllers. Another possible variation is that each sensor and/or valve can automatically control for example number of side channels together. Of course, various combinations of the above and other variations are also possible.

Figure 2A:
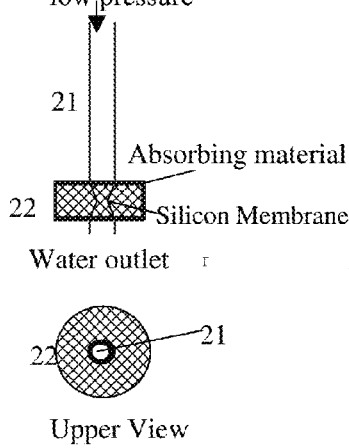
Figure 2B:
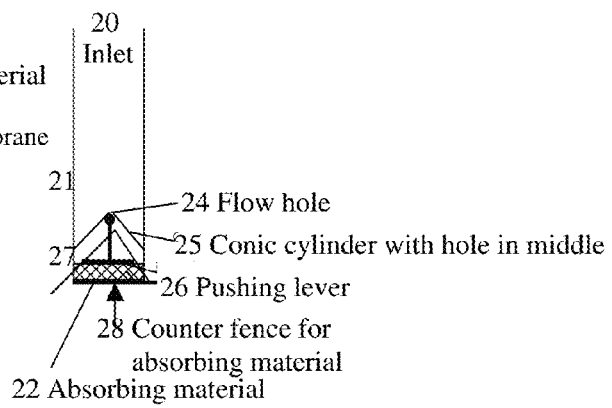
Figure 2B:
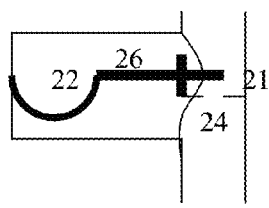
Figure 2B:
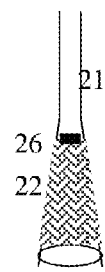
Figure 2E:
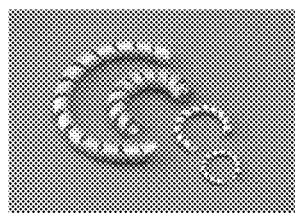
Figure 2F:
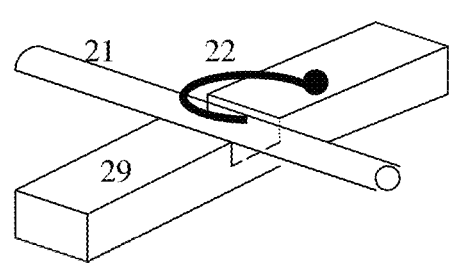
Figure 2G:
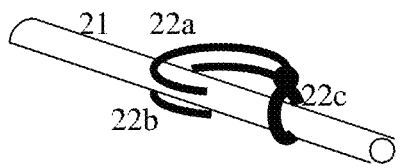
Figure 2H:
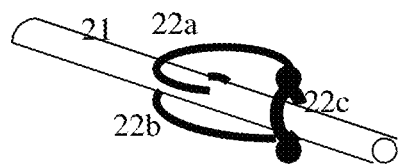
Figure 2I:
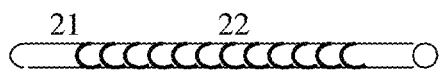

Referring to FIGS. 2a-i, we show a few preferable examples of mechanical sensing based on materials that change their shape when they become wetter or drier and thus efficiently close or open or gradually move a cheap and efficient valve electrically or mechanically, and/or exert pressure for example on a flexible pipe. FIG. 2a shows one or more absorbing materials, such as for example sponge, for example in the shape of a ring (22), with a hole that surrounds a flexible conducting pipe (21) (for example made of silicon, which has very durable elasticity, or for example made of Latex), so that the hole in the middle allows the preferably low pressure water (20) to flow freely until absorbed into the absorbing material, and then when the absorbing material expands (or for example vice versa—when it contracts) it closes the hole in the middle by mechanical pressure. Preferably the pipe is narrow and with preferably thin walls that don't require a large force to squeeze. If it is based on expansion, then preferably the changing ring is closely encased is an external ring (or other shape) of solid material, so that when the material expends it exerts pressure on the internal hole. And when the amount of water is reduced again the material relaxes again and releases the pressure. Preferably the absorbing material touches the soil next to it and preferably there is some distance between the exit point of the water and the absorbing material, so that it is not too directly affected by the water but instead is affected by the conditions in the general soil next to it. However, for example, different such distances can be used for different sensitivity, and one possible variation is that the user himself can easily move the position of the absorbing material for changing the sensitivity. Adding for example more rings (next to each other or for example with certain intervals between them) and/or for example making the hole smaller, can make the system more strongly responsive to changes in humidity. Another possible variation is to use for example water absorbing Crystals or Polymers, preferably slightly cross-linked polymers, or Gel, that considerably swell when absorbing water, such as for example Sacharidic polymers that can expand for example 2.5 times their size when absorbing water, or Silica Gel, or for example any of the materials used in Tampons or in diapers. Preferably these materials are in a shape of one or more lumps but smaller grains may also be used, for example within a one or more solid mesh and/or ring and/or membrane so that preferably water can freely enter or exit but the water-swellable material or earth cannot) that preferably surrounds at least one part of the pipe. Another possible variation is to add some preferably more solid material between the swelling material and the pipe in order to concentrate the pressure more strongly on the pipe. Another possible variation is that these polymers are manufactured directly in the shape of a ring, which can then preferably be fitted for example within an external solid mesh, so that their expansion directly presses a flexible pipe that goes through the ring, and the mesh allows maximum surface interface with the surrounding moisture. However many other shapes can also be used, such as for example polymers in the shape of multiple needles, so that they have maximum surface exposure to the water, preferably based on inserting pressure on a flexible pipe. The needles can be for example each in a preferably rigid mesh-like tunnel, or for example they are rigid enough to work for example in parallel without a mesh, and preferably push together for example a solid object which concentrates their force preferably on a small section of the pipe. Of course a mixture of more than one such material can also be used. According to U.S. Pat. No. 4,655,076, issued on Apr. 7, 1987 to Weihe et. al., there is a large group of water-swellable polymers which can be cross-linked as required to have the desired degree of stability in water and the desired amount of swelling, with good hydration-dehydration reversibility, without hysteresis, and with a response range at the most important range of humidity—between 0 to −15 bars. In fact, Weihe also quotes U.S. Pat. No. 4,182,357, issued on Jan. 8, 1980 to Ornstein, which describes the use of a water-swellable cross-linked gel in a similar way to automatically regulate a flexible pipe or membrane with the aid of a piston that concentrates the force of the expanding gel on a smaller area of the pipe. However, according to the descriptions at http://www.pipeline.com/~lenornst/Irristat.html, which refer to the above patent, it seems like the response time of this device can be at least in certain aspects quite slow, requiring for example 24 hours saturation at the start in order to be sure that the device starts in a closed position. Therefore, preferably other polymers are used which have a much faster response time (for example the materials used in diapers typically expand in seconds, although they are designed to keep the water instead of releasing it easily). Another possible variation is that for faster response the water-swellable material is shaped like a thin folded plate (for example like a heat radiator) so that it has maximum surface connection with the surroundings. Also, preferably the sensors-regulators are used in low-pressure side channels, preferably after using for example the labyrinth structures or other dripper devices or capillary link for considerably reducing the water pressure, since this requires much less pressure to control the pipe and therefore preferably cheap miniature devices can be mass-produced and integrated preferably each with one side channel. Another possible variation is to use one or more hydraulic and/or mechanical levers to change the force and/or displacement factor of the expanding material. Another possible variation is that the solid surrounding material is divided into two or more cells with a movable preferably solid border between them, so that when it is moved by the swelling material it presses the pipe. Another possible variation is to use for example one or more strings from a horsetail hair or other types of hair (or any other organic or synthetic material with similar qualities, such as for example strong sponge is the shape or a string), which expands or contracts according to its wetness, and this string or strings can for example push or pull a lever (Of course the lever can be designed for example so that a small movement translates to larger movement). FIG. 2b shows another possible variation where the absorbing material (22) pushes or pulls a lever (26) for example with a ball at its end, which closes or opens for example a flow hole (24) above it. Preferably, again, the water does not flow directly over the absorbing material, but goes outside into the soil for example sideways through sideways conduits (27). Of course, various combinations of the above and other variations are also possible. FIG. 2c shows for example a preferably solid material (22), such as for example wood or another material or for example bi-material that changes its shape according to its level of wetness. This solid material is for example in the shape of a "V" or a "U" and when it is wet it tends to become more straight due to the capillary action of the water, and then its movement can for example move a lever (26) that closes or opens a hole (24) or can for example directly exert more or less pressure on a for example silicon pipe (21) (or for example it can be more straight when dry and become more bent when wet). A Bi-material made for example of two parallel attached preferably thin stripes of materials, preferably one that expands when wet and another that contracts when wet (such as for example leather and wood), has the advantage that its side-movement can be more conspicuous than the percent of lengthening or shortening of the stripes, like in a bi-metal, which bends or straightens sideways as temperature changes much more than the visible expansion or contraction of an ordinary metal by changes in heat (of course more than two materials may also be used). Of course this can also have the advantage of concentrating the movement in one direction and if thin stripes are used then also it has better surface contact with the water and can also respond faster since water does not have to move deeply in or out. However, since materials such as wood or leather have poor repeatability and tend to degrade over time, preferably synthetic polymers are used, such as for example a considerably expanding polymer side-by-side with a polymer that does not expand or for example expands less or for example with a preferably thin sheet of a strong and flexible material (Of course it could be also for example two or more materials that contract when wet, wherein one contracts less than the other, but such materials are less likely to be available). Preferably two or more materials with similar thermal expansion coefficient are used, since otherwise they would change their shape also as a result of temperature changes. For example two or more polymers (As explained above, preferably in the shape of the two or more preferably thin, preferably solid stripes) of the same type can be used, for example with different levels of cross-linking. (Of course if more than two types of materials with different expansions are formed this is actually a multi-material and not bi-material). Of course, like other features of this invention, this can be used also independently of any other features of this invention, so this can be used also for example for creating better hygroscopes, and in that case the bi-material can for example move a dial mechanically or for example affect an electrical circuit for example by moving an element that changes capacity and/or an electromagnetic field and/or is detected for example optically. Another possible variation is to use for example a complex material that contains capillary or water-swellable material mixed with stronger non-capillary or non swellable material, such as for example two woven fiberglass cloths with capillary materials sewn between them, or for example 2 sheets of a preferably low friction and flexible material such as for example Teflon with a water-swellable polymer between them. Preferably the sheets are perforated with a lot of holes so that water can freely access the polymer. Another possible variation is that the two sheets can be for example rolled like a rollada, with the inner part for example attached to an internal hinge, and the outer part to a tube in which the rollada can rotate so that swelling or contraction causes for example a rotation of the hinge (for example in a way similar to a pressure gauge). Another possible variation is that the rollada is for example based on rolling one or more preferably thin preferably long water-swellable polymers, for example in the shape of a rolled needles, preferably connected at one end to the internal hinge and at the other end to a tube in which the rollada can rotate. The rolled sheet or needle can be for example contained within a mesh that is rolled with it, or is rolled freely for example with a tube. Another possible variation is that the rollada is in the shape of a spiral or helix. In other words, preferably a bi-material (preferably as explained above composed of two or more preferably thin, preferably solid stripes, coupled to each other, in which one of the materials expands more than the other when it gets wet) is rolled in the shape of a helix, and preferably the helix is bent for example into a shape of half a circle (or any other convenient shape, such as for example ellipse or other shapes which can increase the linear motion or any other desired motion). This has the advantage that more choice of preferably sufficiently solid materials is available, since this way even a smaller difference in the expansions can cause sufficient movement of the half circle. This complex material can be easily formed for example by extrusion of the two or more stripes together and then twisting them into the desired shape while they are still malleable. This can work similarly to the Helimorph of 1Ltd (http://www.1limited.com/tech/helimorph/index.html), shown in FIG. 2e, which is a bent helix of two or more Piezoelectric materials that are surrounded and separated by conductive electrodes and translates bending caused by applying an electric field into a linear movement of one end of the half circle up or down (when the half circle is lying horizontally and the other end is anchored). FIG. 2e shows a few Helimorphs of a few various sizes (both in terms of the diameter of the helix and the diameter of the half circle). However the Helimorph translates electric field into linear movement, whereas in this case the bi-material helix works on the principle of different response to water. This mechanical movement of the half-circle can be used in various ways for example to push or pull a lever or to exert pressure on a preferably small flexible low-pressure pipe (for example made of silicon or latex, like in other above similar variations). For example, in FIG. 2f, the flexible pipe (21) can be held against a solid frame (29), and when the free end of the half-circle (or other convenient shape) moves down it puts pressure on the pipe until it closes it and when it moves up it releases the pressure and the water can flow again. Another possible variation, shown in FIG. 2g, it that for example two such half circles (or other convenient shapes) (22a & 22b) which are designed to work in the opposite direction (i.e. the bi-material spirals are for example like mirror images of each other), hold the flexible pipe (21) against each other, and for example when the humidity increases, the free end of half-circle 22a goes down and the free end of half-circle 22b goes up. FIG. 2h shows two such half circles (22a & 22b) of which one is simply connected in reverse to work in the opposite direction. Preferably at the other end the two half-circles are connected together, for example with a preferably solid ring (22c) that fits around the flexible pipe, in order to keep this "clips" in position (Of course similar designs of the contact between the bi-material and the flexible pipe can be used also with bi-materials which are not based on a bent Helix, but as explained above the increased effect of this shape allows a wider choice of materials). Another possible variation is to insert for example the flexible pipe within the helix, like a sleeve, as shown in FIG. 2i, so that when the helix bends it preferably causes the pipe to bend sufficiently to become closed. In this case the helix can be for example also in the shape of half a circle or in other shapes that are most appropriate for this. Another possible variation in that the flexible pipe is threaded for example through two such helixes, which are preferably mirror images of each other and are for example next to each other or twisted one within the other, thus exerting opposite forces on the pipe. Another possible variation is to use for example bi-material stripes or plates which are shaped like fractals, thus increasing to the maximum their surface area, or for example shaped like triangles. (Creating for example a Piezo-electric bi-material as a fractile-like plate, for example like the shape of a snow-flake, instead of a bent Helix, might for example create an interesting speaker which automatically vibrates in multiple frequencies and which automatically stops when the voltage becomes constant. The plate itself might then vibrate sufficiently even like this, or with additional connected or independent similar fractal plates of different sizes, and/or the plates themselves or at least some of them can also be actuated for example by a Helimorph. Another possible variation is for example to shape the vibrated one or more plate like a triangle, for example with a straight profile on each side or for example with at least one side for example with for example a parabolic or hyperbolic or other appropriate profile, so that each cross-section is most fit for a different frequency. In this case the plate is preferably for example actuated by a Helimorph and the plate itself is for example made of a normal solid material or of a Piezo-electric bi-material, or, as above, for example the vibrations in the plate are caused for example mainly by the plate's own actuation. Also the plate might be made for example thicker at the sections where the cross-section is wider in order to allow it to vibrate with more energy. Of course, if a fractal is used, the fractal itself might contain for example similar triangular shapes). Of course these are just examples and other configurations with such twisted spirals are also possible, and also the spiral can be bent also in to other shapes than half a circle—for example in a shape of a snail's shell, in order to even further increase the linear movement effect. Of course, like other features of this invention, this can be used also independently of any other features of this invention, so for example this bent helix can be used also as explained above for creating for example an exact hygroscope that uses such a direct humidity sensor and displays the reading for example by moving a mechanical arm or by any other electronic display (For example by sensing the amount of movement of the free end of the half-circle or other shape, for example optically and/or for example by change capacitance and/or for example electromagnetically—for example by adding a magnet to the moving end and using a sensing coil, etc). Another possible variation is to use indeed the Helimorph of 1Ltd (or similar structures) for pushing or pulling a valve or exerting pressure in a flexible pipe, and activate it by electrical humidity sensors, but that is less efficient than the above direct sensing of humidity, since is requires a power source and since, as explained above, electronic humidity sensors are much more problematic). As explained above, preferably the flexible pipes (21) are side pipes that come out of a main pipe, preferably after reducing the pressure for example by the cheap labyrinths as explained in FIGS. 1-1b. However since these flexible side pipes with the twisted spirals (or any of the other automatic sensors-controllers described above) can live longer than a cheap main pipe with labyrinths, and since as explained elsewhere in this application there are preferably different units available for different levels of desired water saturation, preferably the main pipe comes with a preferably rigid small protrusion where each small pipe can fit, and by default the small protrusion is preferably covered with a small closed pipe or cover which keeps it closed, and thus in places where the user wants to connect these smart side-pipes he/she simply removes the cup and preferably fits the end of the flexible pipe over the small protrusion. This has the advantage that unlike normal cheap main pipes with the water pressure reducing labyrinths, the user can chose to use the outlets only where he needs them. Another possible variation is that the pipe does not come with its own labyrinths or other water reducing elements, and instead the flexible side-pipes come with their own labyrinth or other type of water-pressure-reducing element (for example like in a normal dripper button), so that for example a dripper button which includes the bi-material device is inserted in any desired place into the main pipe (or for example into an existing side-pipe) like a normal dripper button, except that after the water pressure reduction the water goes through the section that is controlled by the bi-material smart sensors-controllers. This can be accomplished for example by designing a special dripper button which contains also the bi-material or multi-material sensor-controller, or for example the bi-material or multi-material sensor-controller is designed so that it can be for example easily mounted preferably on typical size dripper buttons (for example before sticking the dripper into the pipe, or for example applied to drippers that are already connected to the pipe), for example by the aid of a flexible rubber or plastic sleeve. However, since the bi-material or multi-material sensor-controller is, as explained above, preferably inserted preferably at least a few centimeters into the ground, preferably the flexible for example silicon or rubber pipe connects to the dripper (for example through the flexible sleeve, directly or for example trough a more rigid pipe in between) and is coupled to a preferably more rigid part which is preferably partially inserted into the ground and contains the sensor-controller. For example the solid frame (29) which is shown horizontally in FIG. 2f can be partially inserted into the ground, preferably in a vertical position, so that preferably part of the bi-material or multi material is in the ground and the part that applies pressure to the flexible pipe (or that for example moves a valve) is preferably above, for better free movement. If for example configurations like those shown in FIGS. 2g and 2h are used, then preferably part of the bi-material or multi-material (for example a curve of the for example half-circle) is preferably simply stuck in the ground (for example alone or with the aid of one or more pins that help is stick in the ground), preferably in an appropriate orientation so that the flexible pipe preferably remains above the ground, preferably in a more or less horizontal orientation. Although this might be a little more expensive than a normal dripper, it can save the cost of buying a computer that controls the times when the watering is activated, and of course the plants become watered much more optimally, and thus can grow better and quickly bring a return on the investment. Anyway, the material that changes its shape according to wetness preferably absorbs water fast, preferably changes significantly between its wet and dry states, and preferably has high homeostatic balance with the earth, so that it becomes with the same wetness of the earth. This is one of the reasons why the two stripes are preferably thin, since this allows them to respond much more quickly to changes in humidity. As explained above, for the various desired levels of humidity or water saturation preferably different units are available, so that for example for 100% saturation preferably the bi-material (or multi-material) is designed to close the pipe only after 100% saturation is reached, and for lower saturation preferably the bi-material (or multi-material) is arranged so that is closes the pipe already at lower saturation (for example 75%, or 85% or 90% or 95%, etc.), for example by using a bi-material (or multi-material) which reacts more strongly (for example by using two or more materials with a larger difference in the humidity-expansion coefficient), or for example by coupling the bi-material to the flexible pipe at a closer position, so that even a smaller bending can already close the pipe. (Another possible variation is to use such materials for example to help open clogged arteries and/or for example clogged urinary tracts and/or for example various types of clogged pipes, and/or for example increase the blood flow into the appropriate blood vessels for people who have erection problems. In this use for example miniatures of the two half-circles (or other convenient shapes) shown in FIGS. 2g-2h are preferably connected similarly to move away from each other when there is a clogging (except that in this case the force can be for example exerted from within on the internal walls of the for example urinary tract or blood vessel) or for example to move in the opposite way so that when wet the free ends of each move away from each other, and thus increase further the flow of liquid. Preferably the free ends are encased for example in some soft material, for example a silicon ball, in order to prevent it from injuring the walls of the blood or urinary vessels. Also, the maximum linear movement is preferably designed in advance so that it does not exert too much force on the walls of the vessels. Another possible variation is to use for example Piezoelectric Helimorphs for example within such blood vessels, which are for example controlled electronically and/or remote-controlled). Another possible variation is to use for example a capillary material that becomes heavier when it absorbs water from the earth, which has preferably enough free movement to affect for example a scale or a lever, which then for example moves a valve or exerts pressure directly on a preferably thin low pressure flexible pipe. This can be accomplished for example by letting a free rope of the capillary material hang from a lever and freely touch the ground with its bottom part. Preferably any of the above solutions can be mass-produced as miniature versions that are integrated on a small section of the small flexible side pipes, so that the total cost is relatively cheap. Preferably the user can choose from a number of end-unit types—each one fitted for a different desired level of humidity, or for example turning some screw can change the range of response, for example by narrowing or widening the space where the water-swellable material can expand. FIG. 2d shows another variation where the side-pipe (21) terminates like a widening cone with a closed bottom with holes or slits around it, and a capillary material that expends when its wet, such as for example sponge or rope (22) fills up the cone when its wet, thus both decreasing the water flow from the side holes or slits and also pushing up for example a rubber diaphragm (26) that is wider than the pipe, which seals off the passage even more strongly. Although such mechanical sensors may sound primitive, they can be very cheap and efficient, and they have the advantage that they measure humidity directly and therefore do not suffer from all the problems that electrical sensors have because they by definition measure humidity only indirectly. Of course, various combinations of the above and other variations can also be used.

Figure 3A:
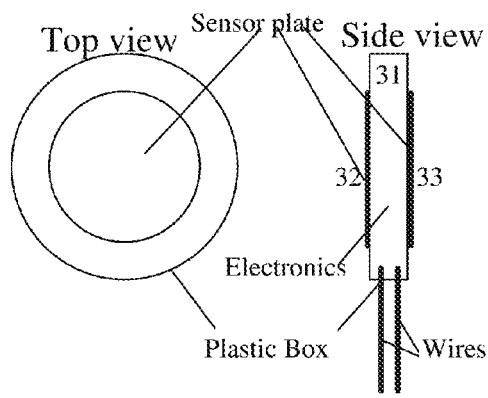
FIGS. 3*a-d* show a preferable example of a cheap and efficient electrical moisture sensor that is both reliable and durable and preferably is not misguided by changes in temperature and/or salinity of the soil.
Figure 3B:
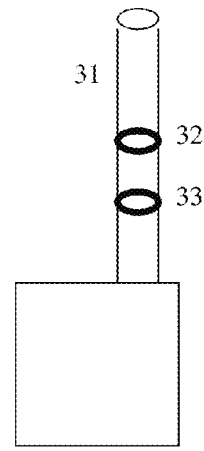
Figure 3C:
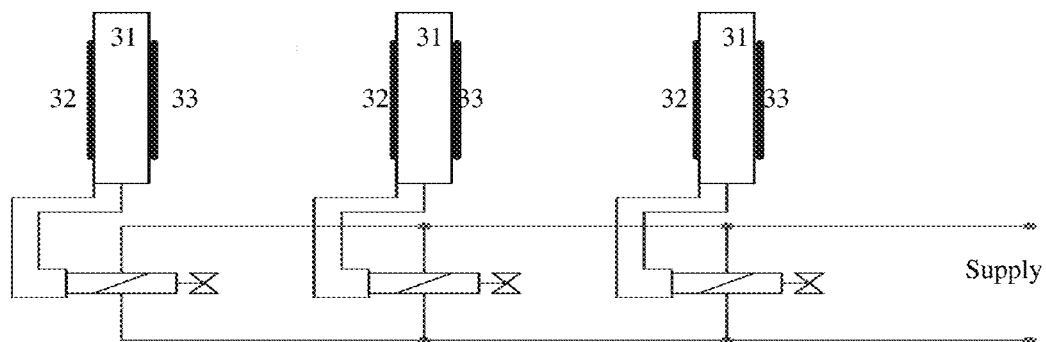
Figure 3D:
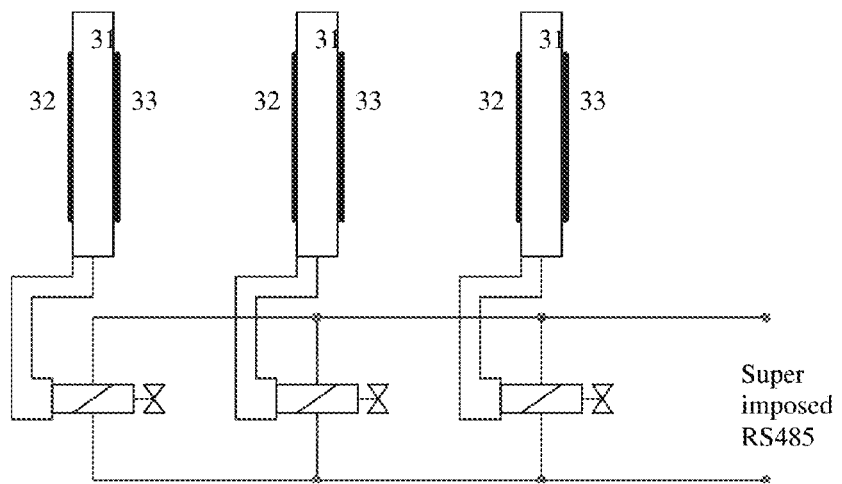

Referring to FIGS. 3a-d, we show a preferable example of a cheap and efficient electrical moisture sensor that is both reliable and durable and preferably is not misguided by changes in temperature and/or salinity of the soil. The sensor uses for example two or more electrodes (32,33) on an electrically insulating element (31) that is inserted into the ground for testing directly the electrical resistance of the ground, which is more or less the cheapest electrical method. The shape of the sensor can be for example like a small dish with two round plate electrodes, one at each side, as shown in FIG. 3a. This dish is preferably small, for example the size of a large coin, and preferably has all the electronics in a printed circuit inside the dish, or for example in the shape of a pole with 2 or more ring electrodes attached to it, as shown in FIG. 3b (however, preferably each such ring is more elongated so that it covers a larger section of the pole), but many other forms can also be used, such as for example a table fork, or many other shapes. On the other hands, the electrodes are preferably large and massive enough so as to be more durable and also preferably have sufficient surface contact with the soil. However, it uses a few smart improvements to overcome the normal problems of simple electronic devices that measure electric resistance: The need to avoid fast degradation of the electrodes, the need to take into account changes in salinity, and the need to take into account changes in temperature. This is preferably done by using for example for the two electrodes different materials (such as for example zinc and copper, or preferably another more chemically-resistant or corrosion-resistant pair of metals or other conducting materials, such as for example silver, chrome, stainless steel, carbon, electrically conducting plastics, silicon with p and n impurities, etc.) and testing (or sensing) both the naturally occurring electrical potential between them, AND then preferably the reduction in current when a current is run through them, so that the potential, which is much more effected by the salinity than by the humidity, shows the level of salinity and can be used to correct the estimate of humidity accordingly. In order to avoid corrosion to the electrodes preferably this is done in short pulses so that for example first the electrical potential is sensed, and then the circuit is reversed and the resistance to the current is measured by actively applying a short DC current in the opposite +/− direction, so that during this measurement the electrodes are also automatically compensated for the small degradation caused by naturally occurring potential when the electrodes are near each other the earth (like in a battery's dielectric). The duration of the two opposite states does not have to be the same, and also the intervals between them can be for example short (such as for example a few seconds or less) or long (such as for example a few minutes), however the counter-current is preferably designed by strength and duration to take into account the time that elapsed from the previous pulse, so as to compensate more or less correctly for the loss of ions caused by the naturally occurring potential. If for example one electrode is of carbon and the second of silver, the carbon electrode is not sensitive to aggressive chemicals, but after a long time the silver electrode could still be eaten away, so in the reverse pulses by connecting the silver electrode to the positive and the carbon to the negative, the silver particles that separated will return to the silver electrode according the electrolytic principles and this repairs partly the electrodes. Such electrodes will have of course a considerably lower potential than for example copper and zinc, but it can still be detected with a more sensitive sensor, and what matters is the changes in the potential. In order to take into account also changes in temperature, preferably a small thermometer, such as for example a thermocoupler, is added or integrated into the circuit, or for example one of the electrodes is itself used together with another metal as part of a thermocoupler. Another possible variation is to include for example in the circuit that measures the electrical resistance also for example a PTC (Positive Temperature Coefficient) thermistor with appropriate parameters, so that it automatically increases the resistance when the temperature rises, in an amount that more or less compensates for the natural reduction in the earth's electrical resistance as the temperature rises. Another possible variation is using for example a leaking diode in which the amount of leaking in the opposite direction is affected by the temperature. Another possible variation is to add for example to each valve a manual switch of preferably more than 2 states, so that the user can override the system for individual plants (or areas) and indicate that certain sensors or valves should be more generous or less generous with their water supply (which can be accomplished for example by releasing more or less water for each given level of humidity, or for example by changing the threshold of humidity that is considered sufficient, or any combination of these). A good example would be again a raspberry bush, which if watered optimally could easily spread very fast into many other places. So, if watered optimally it might take over other plants, so a user might want to restrain it on purpose by limiting its water supply for example to less than optimal. This manual setting can preferably done also if mechanical sensors are used. Another variation is to use central control over individual plants or areas, but that is less desirable since it is more expensive, and also might require more power lines, unless a smarter and more expensive device is used for each controller so that they can identify for example a given code and respond only if their individual code was named. Like with the mechanical sensors, preferably there is some distance between the sensor and the actual point where the water is released. The output of the sensor can be for example an on/off command, based on some predefined or user-adjustable threshold, or a more exact value, for example in a number representing percent of humidity, or for example some scale, and it can be either in the form of an analogue signal or for example a digital signal. A digital signal for example can be used more easily by a processor or circuit in the valve, but also involves more electronics in the sensor itself. Another possible variation is that the sensor control and valve control are integrated into the same circuit (however, they are still preferably distant enough from each other.

We describe below in more detail an example of using a digital output for example with the device shown in FIG. 3a: The sensor can be for example a sandwich of 2 non-oxidizing metals separated by a plastic or PVC plate, and in the plate are the electronics of measuring and transmitting of the humidity impedance. There are 2 wires that are hermetically connected. The sensor is preferably inside the soil, preferably in nearly the same depth as the roots of the plant. The electronics creates for example a 16-bit BCD code that changes according the humidity, or any other convenient coding. If needed, for example 8 bits can be used for identification and 8 for measurement (if more that 1 sensor can be accessed for example from a central control or from an intermediary branch on the hierarchy). If there is no need for identification, a total of 5 bits is good for representing 16 levels of measurement. The wires of the sensor are connected to the electronics of the solenoid that supplies the water to the plant. The electronics can be for example connected to a total of 4 wires: 2 sensor wires that connect between the sensor and the valve that it controls, and 2 energy supply wires that come for example along the main pipe from a transformer connected to the electrical network. Preferably, the same power lines are connected to all the sensors and valves that go out from each main pipe. Another possible variation in that each sensor or some sensors can control more than one valve. Another possible variation is to add for example also 1 or 2 additional lines for central control, for example for creating the ability to override all (or some of) the individual sensors by a general "On" command or "Off" command. Another possible variation is that such control command can be transmitted over the power lines themselves, for example by superimposing an RS485 or other data transfer protocol over the power lines themselves. Another possible variation is that the electrical wires are part of the pipe, for example integrated within an intermediate layer in the body of the pipe. Another possible variation is that the sensor and the valve are for example integrated into one circuit or component, but in that case preferably the electrodes of the sensor extend to an area somewhat away from the valve, or the valve controls the low pressure side-channel at some distance from the actual edge where the water is actually released, so that the sensor measures the earth in that general area and is not affected too much by immediate feedback from the water as it exits the side-channel. Of course, various combinations of the above and other variations can also be used.

Figure 4A:
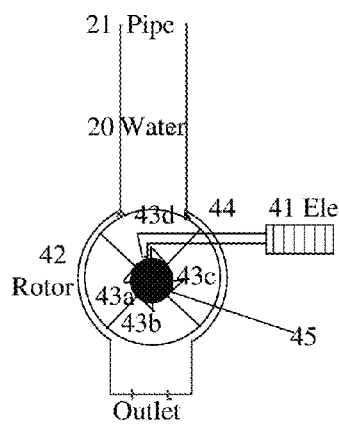
FIGS. 4*a-c* show a few examples of cheap electrical valves that preferably work with low water pressure.
Figure 4B:
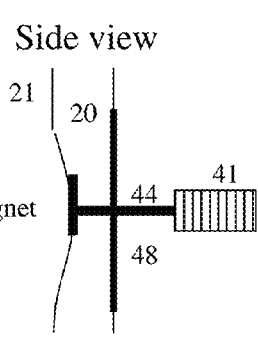
Figure 4B:
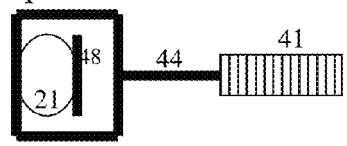
Figure 4C:
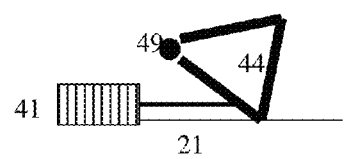

Referring to FIGS. 4a-c, we show a few examples of cheap electrical valves that preferably work with low water pressure. FIG. 4a shows for example a water solenoid based on a rotating element (42) that is divided into for example a few cells (43a-43d) and preferably is limited for example by internal valves to rotating only in the desired direction. When the valve gets a command to release water, for example an electromagnet (41) pulls a lever (44) that connects to teeth in the rotating element and causes the rotating element to advance one or more steps. For every pulse, the drum in this example turns for example 90 degrees (or any other convenient angle) and the water (20) that comes from the pipe (21) above is released into the outlet. Of course this is just one example and many variations are possible and of course for example more or less cells can be used. This has the advantage that every pulse can release a clear amount of water, so that for example if water pulses are counted then the amount of water that was released can be easily computed. However, such a solenoid might still be not cheap enough. FIG. 4*b* shows an even simpler and cheaper valve, based for example on an electromagnet (41) that pulls or pushes a lever (44) that for example encircles a flexible pipe (21) (for example made of silicon at least at the position of the valve) and directly presses the pipe for example against a solid contra-wall (48). Preferably the lever (44) has a tendency to remain in either the closed or the open position even when electric force is not used, for example by teeth that snap into position when it is in one of the stable positions. Another possible variation is that the electromagnet works for example with a spring and force is needed for example to keep the valve open. This has the advantage that in case of electric failure the valves will automatically close. Another possible variation is that for example that the valves of the side channels lock into position without the need for force, but for example the main faucet is designed to automatically remain closed (or in another variation—open) when power fails. Another possible variation is that for example more than 2 states can be used, so that the valve can exert also intermediate levels of pressure depending on the humidity reading of the sensors. FIG. 4*c* shows another variation where the element (44) that closes or opens the water passage by exerting pressure on the pipe (21) for example rotates slightly around a hinge (49). Again, preferably, it automatically locks into one or more desired position. Of course, various combinations of the above and other variations can also be used.

Figure 5A:
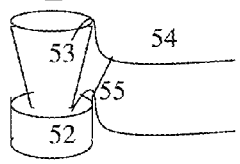
Figure 5B:
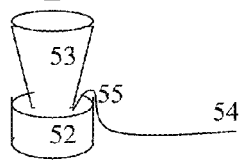
Figure 5H:
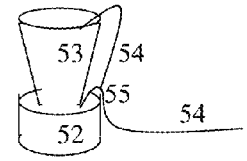
Figure 5C:
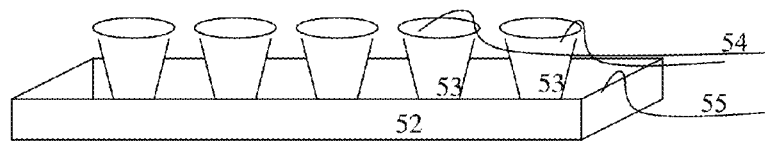
Figure 5D:
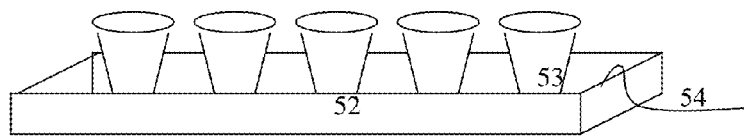
Figure 5G:
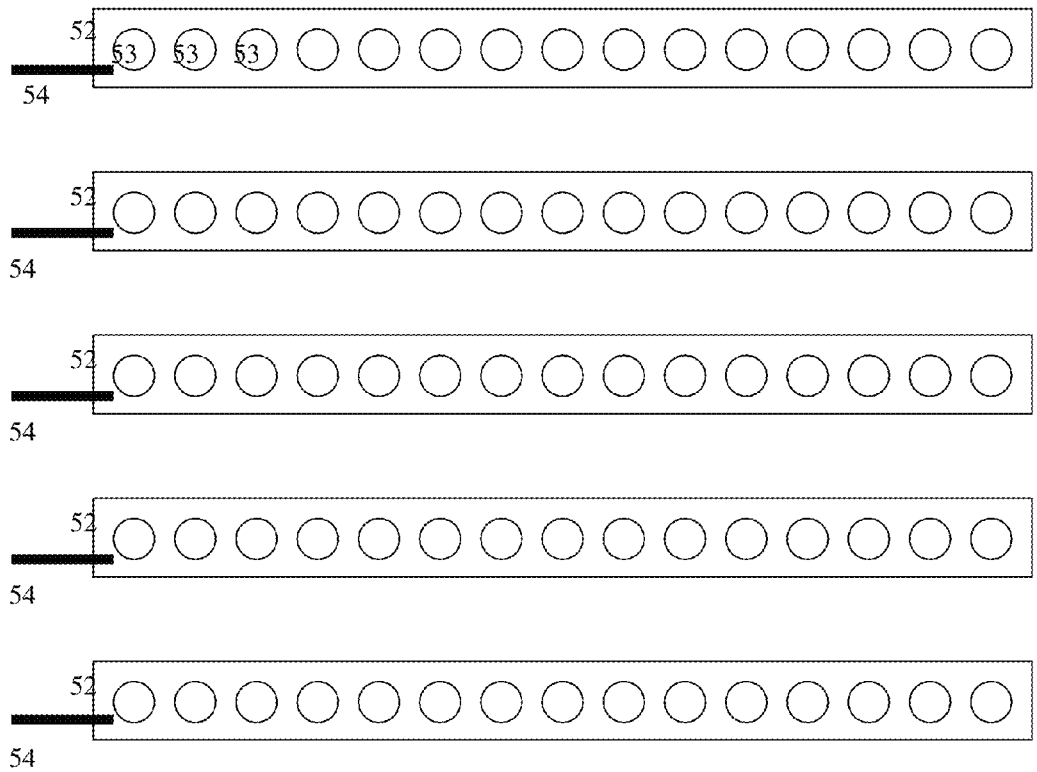

Referring to FIGS. 5*a-h*, we show a few preferable examples of cheap and efficient sensor (55) and water supply (54) that take advantage of the bottom dish (52) of one or more flowerpots (53). The sensor can be placed preferably on the bottom of the dish, so that it merely has to sense if it is in water or not, which is much easier then sensing the level of humidity in the earth, since it does not have to face all the problems described above. This can be done for example by a simple electric circuit that is closed when it is in water or for example by a simple preferably small element with a floating part, that preferably moves up when there is water in the dish and down when there is no water or less water and opens or closes a valve mechanically or electrically. However, for this valve to be cheap and reliable preferably it works on reduced-pressure water, like in the solutions described above for gardens and fields, so that preferably only the main pipe or pipes has higher pressure and each side branch that goes into a bottom dish preferably works with much smaller pressure, accomplished for example by the labyrinths method. This on/off method is free of all the problems described above, and also is optimal in the sense that the earth in the flowerpot can always be kept even at more or less maximum humidity, and yet it is very efficiently since the reserve water is always kept at the bottom dish, instead of going down deeper into the ground, as it would do in a garden or in a field. The actual watering of the flowerpot is preferably done by letting the sensor control directly an adjacent valve on a pipe that enters or comes near to the flowerpot soil from above. This ensures that the water will go through the soil from the top down before it reaches the dish. Another possible variation, shown in FIG. 5*b*, is that the water pipe (54) drops water for example directly into the bottom dish, which has the advantage of making the device even simpler, and due to capillary action, the water is absorbed in the soil anyway even if it comes only from below. This has the further advantage that especially in this case the valve control can be even more easily done mechanically for example with a small mechanical sensor with a preferably small floating element connected to a preferably small arm like a miniature floating arm of a Toilet's Niagara that directly moves a mechanical valve or exerts pressure on a flexible (for example silicon) pipe when it floats up, since this can be extremely cheap, and also, unlike in the soil, there is no need in this case to keep the sensor at a distance from the valve, since when directly inside the water there is no problem of propagation. Another possible variation is that in this case preferably there are more holes and/or larger holes at the bottom of the flowerpot in order to allow the water more easily to enter the soil from below. Another possible variation is that the bottom of the flowerpot and/or part of it and/or part of its lower side walls is made of a fine mesh instead of plastic (such as for example like in a fine flour sieve) or some other preferably fine porous material, in order to further increase the ability of the water to easily climb from the bottom up into the soil, while preferably blocking the soil from entering the water pool below. Another possible variation is adding for example preferably sturdy vertical capillary protrusions to the bottom dish so that they are stuck into at least some of the holes at the bottom of the flowerpot and go up into its soil in order to even further facilitate the absorption of the water from below. In the version where the water is entered directly into the soil from above trough pipe 54, the control can either be done for example with an electrical valve like those described in FIGS. 3.*a-c* (for example with a mechanical sensor (55) like the small arm described above, but in this case affecting an electrical switch, or with a simple electrical circuit that becomes closed when water is present), or mechanically, for example by letting the arm of the sensor for example move a metal wire within a hard preferably flexible sleeve that is coupled to the water pipe that reaches the soils from above, similar for example to the way that breaks or gear are controlled from away in bicycles. Another possible variation is that in this case the mechanical sensor (55) for example controls a valve or exerts pressure directly on the part of the pipe (54) that passes next to it, before the pipe bends to go up into the flowerpot from above, as shown in FIG. 5*h*. Another possible variation, shown in FIGS. 5*c-d*, is to use these features in combination with using each dish in sharing with more than one flowerpot, for example by creating a round or square large area in which the flowerpots are together side by side, or for example using an elongated dish that supports many flowerpots next to each other in a line (for simplicity only 5 flowerpots are shown, but preferably a much more elongated dish is used with a much larger number of pots). In these variations preferably the dish is balanced horizontally, so that the water is more or less evenly spread around it. Preferably, the dish has higher walls than normal flowerpot dishes, since a very long dish is more sensitive to slight deviations from horizontal balance, and also this enables more flexibility in the speed of the water supply by creating a larger common pool. This way, preferably one sensor is enough for the entire dish. In this case, if the variation of entering the water directly into the soil from above is used, then preferably each flowerpot (53) gets its own water supply, however this has the disadvantage that it can for example force more water to run also though the soils of plants that need less water, thus causing unnecessary erosion of their soil. If the variation of watering the dish directly is used, than also preferably only one water supply and one valve is needed for the dish. This has the further advantage that this way automatically each plant that needs more water absorbs more water from the common pool into itself and therefore into its soil, and as long as there is sufficient water in the common dish and yet the water does not overflow, no plant is underwatered and no plant is overwatered, even for different types and sizes of plants, different soil types, etc. The elongated dish variation has the advantage that it is more practical and more easy to balance, and also allows easy access to every plant, whereas a dish extended in two dimensions would make it hard to access the inner flowerpots without stepping into the dish. This can be used very easily for example in balconies, homes, offices, or plant nurseries. An array of multi-pot (53) elongated dishes (52), each dish with its single water supply (54), preferably with the simple mechanical water sensor and valve at the end of the pipe at the bottom of the dish, which can be used for example in a plant nursery, is shown for example in FIG. 5g. Another possible variation, shown in FIG. 5e, is to use for example dishes that are covered on the top and have for example holes in the top part for inserting the flowerpots (for simplicity only 3 holes are shown, but preferably a much more elongated dish is used with much more holes). This has the further advantage that less water is lost due to evaporation directly from the dish (of course, the holes can be also closer to each other, or for example more than one row per dish may be used). Various hole sizes can be used, or the cover can be for example from nylon and for example the holes can be easily enlarged as needed by pressure for larger flowerpots). Preferably the flowerpots touch the floor of the dish. Another possible variation is that they are held a little above the bottom for example by using smaller holes that hold the flowerpots a little higher or by using for example additional internal smaller walls inside the dish—in order to make it even easier for water to enter the soil from below, however this is not necessary since typically flowerpots have small protrusions on their bottom in order to lift their holes a little above the bottom of the dish. The cover can be supported for example by the external walls of the dish, or for example also by internal walls (56) at various places. Another possible variation is to connect a number of such preferably elongated bottom dishes for example with side pipes (for example with one or more side-pipes connecting between each two dishes), so that one set of sensor and water supply can take care of more than one dish. In this case preferably the connected dishes are more or less at the same vertical level. Another possible variation, shown in FIG. 5f is to use for example a water absorbing material, such as for example one or more ropes or sponge between each two dishes, to transfer water by capillary action even between dishes that are not at the same level, since the capillary action works two-ways based on the surface tension of the water, even opposite to gravity. Another possible variation is to combine the above for example with time control, so that for example the dishes are kept with water in them only for example for a few hours each day. This gives more flexibility in setting the moisture content in the soils, so that lower moisture levels can also be used. The above variations are a major advance over the current state-of-the art of methods of irrigating plants in flowerpots. Another possible variation is to use these multi-flowerpot dishes in any of the above configurations with manual filling of water in the dish, which is of course less efficient then automatic control, but still, if for example a plant nursery is divided into a number of rows, each with an elongated dish that serves for example dozens of plants, this is already much more efficient than the current state of the art, since all the workers have to do is water each of the elongated dishes, which is much more efficient and easy than having to water each individual plant, and yet each individual plants gets more optimal conditions than by the normal method of watering each plant individually. Of course, various combinations of the above and other variations can also be used. Also, the same methods described for gardens and fields can be also used with flowerpots, however some of them would be less efficient.

Figure 6:
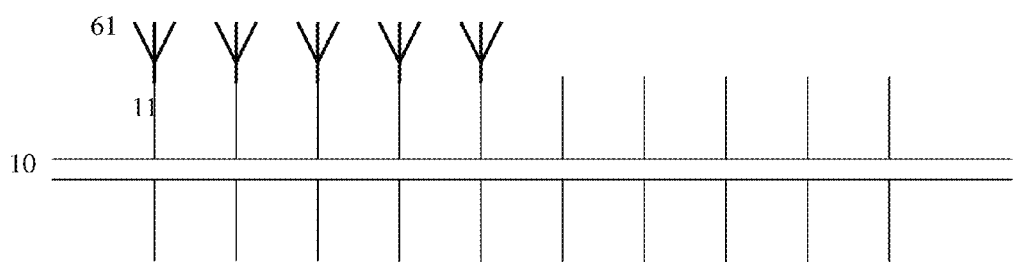
FIGS. 6 & 6*b* show a preferable example of using reversed capillary pressure at the end of the side channel, so that when the earth has reached a certain humidity level it automatically creates an equilibrium for example in osmotic and/or capillary pressure that stops the water flow until the level of humidity of the earth has sufficiently decrease again.
Figure 6B:
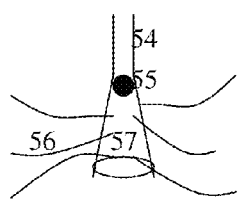

Referring to FIGS. 6 & 6b, in FIG. 6, we show a top view of a preferable example of using reversed capillary pressure at the end of the side channel, so that when the earth has reached a certain humidity level it automatically creates an equilibrium for example in osmotic and/or capillary pressure and/or any other type of counter-balancing force that stops the water flow until the level of humidity of the earth has sufficiently decreased again. This can be accomplished for example by adding a water absorbing material with minute capillary pores (61) coupled to each side channel (11) (preferably at its edge that touches the soil), with a pore size small enough as to make the capillary action stronger than the water pressure itself, so that a balance of capillary pressures can be quickly reached when the earth become wet enough. This capillary material preferably does not change its shape when it becomes wet, such as for example Tuff stones. Another possible variation is to preferably design the pores to be asymmetrical, so that they are for example narrower at the side of the water supply than at the side of the soil, so that the capillary action tends to come for example more from the earth into the side channel, so when the earth becomes filled enough with water, the force drawing back water from the earth balances the force supplying the water. Another way to explain this is that if we use normal symmetric capillary materials, then as long as there is even low water pressure in the pipe, water will keep always flowing into the earth, since the water in the pipe is always more moist than the earth. If we used for example a completely one-directional valve or capillary material that counteracts the water pressure, then water would never flow. But when we use asymmetric capillary material or materials, somewhere between these two extremes, than there will always be a certain level of humidity of the earth where equilibrium is reached, depending on the level (or on the gradient) of asymmetry of the asymmetric capillary material and on the water pressure in the pipes. When the plant (or plants) in the given areas sucks up the water it needs, the earth's level of humidity becomes again below the level of equilibrium, and thus water is added again. Of course, this principle of reaching the desired equilibrium by using asymmetric capillary materials can be used also independently of any other features of this invention. (It might be used also in other areas apart from irrigation, such as for example in medicine, for example for creating an artificial heart with input and output tubes based on asymmetric capillary material, for increasing efficiency). One way of accomplishing this is by using for example asymmetric carbon capillary membranes, which already exist, or similar materials which already exist, such as for example asymmetric polysulfone membranes or asymmetric ceramic membranes, which have funnel shaped pores, that can vary for example between 0.2 to 20 micron or over a smaller range. Another way is to use for example small capillary tubes which are preferably narrower on the side of the water supply. Another possible variation is to use for example static negative charge and/or materials that contain more Oxygen on the side of the water supply, since water is attracted more to negative charge and to materials containing Oxygen. Another possible variation is to use other forms of asymmetric pores, such as for example V-shaped pores. Another possible variation is to use for example a gradient of different materials, so that the materials closer to the side of the water supply have higher capillarity. Another possible variation is to use for example membranes or materials which are more hydrophilic on the side of the earth and more hydrophobic on the side of the water supply, like in normal roots. This is actually more like adding a normal root of exactly desired parameters at the end of each side channel, except that it is preferably synthetic, since adding for example a real root or part of a root would cause the root to start to grow into the side channel and thus block it permanently. Another possible variation is that preferably this capillary material is shaped like a root with branches, so that it senses and interacts with the soil's moisture in a larger area. Additional adjustments can preferably be done by changing the water pressure at the side channels (for example by changing a local switch manually or by changing the water pressure in the main pipe), since different levels of pressure will reach equilibrium at different levels of humidity of the soil, and/or by letting the user for example choose between a number of such asymmetric capillary materials with a different gradient or coefficient of asymmetry, so that for example various choices are used for various desired levels or percents of humidity. For example, there might be asymmetric side branches for reaching for example 25% humidity in the earth, other types of asymmetric branches for reaching for example 50% humidity in the earth, other types of asymmetric branches for reaching for example 75% humidity in the earth, other types of asymmetric branches for reaching for example 85% humidity in the earth, other types of asymmetric branches for reaching for example 90% humidity in the earth, other types of asymmetric branches for reaching for example 95% humidity in the earth, and other types of asymmetric branches for reaching for example 100% humidity in the earth (or any other desired percent). Another possible variation is that this capillary material (preferably in the shape of a root) is itself also used to sufficiently lower the water pressure at the side channels, so no other device such as for example the labyrinths are needed, and the only control needed for the water pressure is for example in the main pipe or in other levels in the hierarchy, if there are more than 2 levels. Another possible variation is that when the earth is wet the artificial root sucks up water like a plant into some container that becomes filled with water for example like a thick leaf, and when the earth is dry the water level in the container drops, and the sensing of humidity is preferably done by an element that can sense when it is in water, like for example in the variations described for flowerpots. This sensor preferably affects the water flow in that area for example mechanically or electronically. Another possible variation, shown in FIG. 6b in a side-view, is that the low pressure side pipe (54) enters the earth preferably more or less vertically and ends for example in a preferably widening cone shape (57) and a closed bottom, and for example a rubber ball filled with air (55) or similar floating object, which is wider than the pipe, acts as a very cheap valve, or for example any other type of preferably cheap Niagara-like container with floating valve can be used. These containers can be for example closed to the outside air, which can add the balancing force of vacuum, or for example with a pipe allowing air to enter. Out of preferably small holes at the sides of the cone (57), capillary materials, such as for example strands of rope that look like roots (56), are in contact with the ground. At first the water fills the cone until the ball floats and blocks it, and then as the earth absorbs water from the capillary materials they remove water from the cone until the ball drops down again and allows more water to come in. When the earth is wet the water comes out more slowly from the capillary materials, and also they start acting also like a normal root since the capillary force works in both directions. Another possible variation is that these root-like structures (56) go mainly in a direction upwards from the cone, so that the water has to climb up in them against the direction of gravity, and thus gravity acts as the counter-balancing force. In this case, preferably at least part of the capillary material that is going up is covered with a non-porous material along the way, such as for example nylon or plastic tube, so that the water indeed has to climb up first without being sucked by the earth along the way. Preferably the container is for example cone shaped and preferably becomes elongated again at least on its bottom part, so that the bottom has preferably a more or less sharp edge and can be easily inserted into the ground. Of course, each container can be used for example for one plant or for many plants, so that there can be preferably smaller containers for single plants or larger containers, preferably with a large spread of capillary branches, for multiple plants. In this case another possible variation is that various end-units are available for various levels or percents of desired humidity of the earth, so that for example end-units where the capillary material climbs higher and/or has weaker capillary strength are used for lower levels of desired humidity. Like in FIG. 7, preferably the valve does not open all the time after the water in the container has gone down a little bit, but only after the water has gone down by at least a certain desired amount. This helps the device live longer, and is especially important in case vacuum is used, since if the valve would open every time the water goes down by even a very little amount, then it would be almost like constant flow and there would practically be almost no time when the vacuum actually exists. Also, preferably, while the valve allows refilling, the water is blocked from going out through the capillary openings, like in the variations of FIG. 7. However, like in one of the variations described in the ref. to FIG. 7, another possible variation is that when the valve allows refilling it opens for only a very short time and the container is refilled quickly, in which case there is no problem since the water moves much slower through the capillary exits. This can be accomplished for example by using a vertical element (for example a rod) with two wider parts at its ends, with a floating element for example around the central rod, so that the floating element changes the position of the vertical element only when it reaches one of the two extremes. Another similar variation is for example using an external moving part that affects the water supply with top and bottom arms (for example in the shape of a horizontally rotated V), so that a floating element affects the bottom arm only below a certain water level and the top arm only above a certain water level. Another possible variation is that this is accomplished for example by using two Niagara-like containers for each side branch—a main container with the vacuum and capillary exits to the ground, and an auxiliary supply tank that just is ready all the time with water, and when the water has gone down sufficiently in the main tank, it releases the water in the supply tank to quickly refill the main tank. Another possible variation is that various types of main tanks are available for various levels of desired percent or level of humidity in the ground, so that for example tanks where the vacuum force is stronger are used for lower humidity and tanks with weaker vacuum force are used for higher humidity. The vacuum force can be controlled for example by changing the height of the tank and/or the amount of water in it and/or the height or percent that the water in the tank is allowed to go down before the refill valve is released. These tanks are preferably small and very cheap since they preferably work on low-pressure water supply. Another possible variation is that this can work even without the floating valve (and then many other shapes of the container can also be used), since if the side holes are small enough the rate of absorption by the earth will depend mainly on capillary forces and thus on the wetness of the soil. Another possible variation is to combine this for example with a time schedule, so that the device is activated for example only for a few hours each day, and during its operation the earth's wetness determines the amount of water released. Another possible variation is to use a very strong capillary element that has capillary strength much higher than the earth, such as for example at least two pieces of glass or plastic or other suitable materials that are parallel to each other at a very close distance (for example plates a few nano or dozens of nanometers apart), or for example a paper rope with pressure on it, with or without capillary asymmetry, so that the very strong capillary material tends to suck water off the earth more than give it to it. This material can be either straight or for example spiral shaped, and preferably relatively long, so that the water has a longer passage between the water supply and the earth, thus making the capillary forces more dominant. If a spiral is used, it can be for example in a direction opposite to the normal direction of a water vortex (such as for example is created when water exists a bath sink) on that side of the planet, thus adding an additional counter-balancing force), or for example in the same direction. Another possible variation is to use an irregular capillary material, so that at least one part of the capillary material is preferably with considerably stronger capillary strength, as shown for example in the example below. Of course, various combinations of the above and other variations are also possible. These variations can of course be used also with flowerpots. The above methods can be defined in general as chemical or structural methods, as compared with mechanical or electronic methods of sensing and control. Another possible variation is using such asymmetric capillary materials also inside plants that need them, such as for example twigs, so that for example if a branch (or other part) of a plant or tree is cut and inserted into the ground or for example into water for developing its own roots, the asymmetric capillary material can be inserted for example at the bottom of the branch (preferably by using a narrow edge like a needle), and thus act as an artificial root, helping to nourish it until it develops its own real roots, at which point the artificial root may be for example removed.

A few of the possible ways of manufacturing such asymmetric and/or irregular capillary materials are for example:

a. Creating for example a glass or plastic rod with multiple holes like in an optic holofiber with multiple holes, and then stretching the tube with asymmetric pressure for example so that at one end is only pulled away from the other end and at the other end it is also pulled sideways so that it becomes wider than at the other end and thus the holes are also cone-shaped with one side wider than the other.

b. Creating for example a sponge-like material, for example by baking it in a tube with one or more gas-releasing substances for creating the airy structure, and then using for example centrifuge for condensing gradually more solid material at the edge of the centrifuge and more airy material at the center.

c. Starting with a central grain and for example dipping it in a material (preferably liquid) with small holes (or bubbles) that condenses around it, and then after it solidifies, dipping in a material with larger holes or bubbles, and so on (or vice versa—in the order of decreasing hole sizes), and then cutting it into stripes so that each stripe is a cross section of many layers.

d. Baking for example a sponge-like material at a certain mechanical pressure or with a certain pressure of air-producing substances, letting it cool a bit, baking it again inside a similar material with less pressure or less air producing substances, and so on in a number of stages (or in the opposite order). This can be done for example in a tube, so that the first material inserted is at higher pressure and the final material inserted is at lower pressure.

e. Drilling or boring for example cone-shaped (or other types of asymmetrically shaped) holes or tunnels for example into a sponge-like or rubber or plastic material, or other type of capillary material.

f. Using one or more molds for casting for example sponge-like or rubber or plastic material (or other type of capillary material) into the desired shape, preferably with cone shaped holes or tunnels (or other types of asymmetric tunnels).

g. Using for example an ordinary absorbing rag (or other flexible capillary material) which is preferably squeezed in a gradient, for example by pushing it into a narrowing tunnel, for example a cone-shaped solid tube (for example made of hollow metal or plastic) or for example two close plates at an angle, for example of glass or plastic, so that the pores within the sponge become gradually smaller as the tunnel becomes narrower (This has the further advantage that if for example the tunnel's gradient can be changed mechanically, the user might have further manual control of the level of asymmetry, without having to switch to a different part).

h. Using a gradient created by putting closely together at least two solid preferably elongated plates of material such as for example glass or plastic, so that at one end they are closer than at the other end, preferably with some solid obstacle that keeps them apart at each end, and preferably covering the sideways sides for example with Glue (such as for example Silicon or Epoxy) or gluing or soldering two side walls. These plates can be used for example with or without putting additional capillary material between them.

i. Using a preferably soft and flexible capillary material, such as for example paper or absorbing rag, preferably in the shape of a rope, in which at least one part is pressed into a lower diameter, for example in the shape of one or more rings along the way. Of course many additional configurations can be used for reaching similar results, and various materials instead of or in addition to paper or absorbing rugs can be used, and/or various pressures in the one or more rings (or in other shapes) can be used and/or various ratios between the compressed and uncompressed parts of the capillary material, and/or various directions or orientations or shapes of the capillary materials. Preferably any of the above parameters and/or various pressures of the water supply can be used for reaching various desired levels of wetness of the earth. Another possible variation is allowing the user for example to turn a screw in order to create various levels of pressure on the compressed part or parts of the capillary material. (Also, as explained above, even if 100% humidity is used, another possible variation is to combine this for example with a time schedule and/or for example to add air with the water supply in order to reduce the risk of roots rotting).

Of course, various combinations of the above are also possible.

Figure 7:
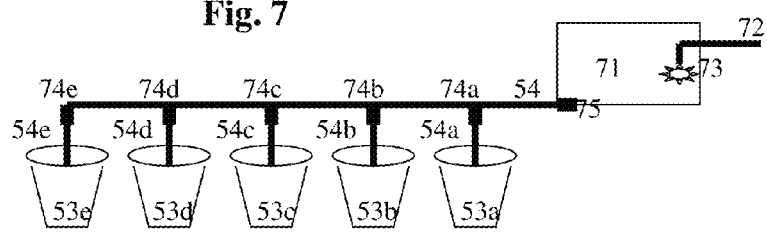
FIG. 7 shows a preferable variation where each such side-branch has a humidity control based on air passage, with shared or individual air-tight containers.

Referring to FIG. 7, we show a preferable variation where a number of plants in a garden or field or in flowerpots (or many plants) are irrigated using for many plants or at least for each sub-group of them a common water tank like a Niagara (71), but air-tight. This example shows flowerpots (53a-53e) but it can be used similarly also in gardens and fields. The Niagara-like container preferably has a water supply (72) and water level sensor (73), so that preferably after the water has gone below a certain level the tank is automatically refilled. Preferably, while refilling, another valve (75) at the exit pipe (54) automatically closes, otherwise the water would keep flowing out while refilling. One or more exit pipe (54) leads from the common tank (71) to the plants, where preferably each side branch (54a-54e) for example goes preferably more or less vertically into the soil in a flowerpot (53a-53e) or (if it is in a garden or field) into the soil near one or more plants (however other angles are also possible such as for example a diagonal or even more horizontal direction), so that each such side-branch has a humidity control based on air, as explained below. In the case of flowerpots, preferably each side branch goes down to a little above the bottom of the flowerpot, for example into a depth of 1 cm above the floor of the flowerpot and so water starts dripping into each flowerpot until the water reaches the bottom of the preferably vertical side-pipe (51a-54e), and then stops since the air cannot enter the side pipe anymore, so any further water coming from the common tank (71) would create a vacuum in the tank. When the earth becomes drier and absorbs more water from below the pipe, air can again enter, so new water is released again into the flowerpot from the common tank. However, the main problem with this configuration is that if even one of the flowerpots is for example in a higher position than the others or even one of the side pipes for example has been inserted to a depth for example of only 3 cm above the bottom instead of 1 cm above the bottom, then the law of combined vessels will cause that flowerpot to flood the other flowerpots. Therefore, preferably each of the side pipes (54a-54e) has also a unidirectional no-return valve (74a-74e), so that no water can go back up in it, however air can go up (this can be accomplished for example by using a floating ball that goes up if the water tries to go up the side-pipe, but allows air to go through). However, in this method, if the flowerpots are together in a common bottom dish, that would still cause flooding of the others if even one of the vertical pipes ends too high in the pot, so the no-return valve would still not solve the problem, so care must still be taken that the pipe is deep enough in each of the pots. So preferably in this case each pipe is with its own dish, but, still, if the pipe is not deep enough and its bottom end is above the height of the bottom dish's walls, the bottom dish will still overflow. So in fact, this can work even better if the flowerpot has no hole in the bottom and is used without a bottom dish at all. A more preferable variation is that instead of flooding for example the bottom of the flowerpot (for example the bottom 1 cm of it), the bottom of the preferably vertical side pipe (54a-54e) is preferably closed and preferably there are holes or slits on the sides of it and preferably a capillary material such as for example sponge is inserted into the bottom of the side pipe, so that it touches the soil though the side holes or side slits of the vertical pipe. This way it can work even without regard to the bottom of the flowerpot, and therefore this can be used also in fields and gardens, where there is no "bottom". Another possible variation is to use this together with the variation of inserting a "bottom" of for example plastic or nylon below the earth in a garden or a field. Another possible variation is to use for example just a capillary material at the end of the pipe, such as for example sponge or ceramic substance that can let both water and air path through it but preferably blocks the earth from entering it. This porous material preferably allows air to enter into the side pipe only when the earth near it is not wet. For different levels of sensitivity preferably the user can choose for example between a number of side-pipes, so that for example for achieving higher humidity a side-pipe with a sponge of bigger holes is used. These variations where the vertical pipe does not flood the bottom of the flowerpot are therefore more preferable, since they can be used also in fields and gardens, and since they are based on blocking the air passage when the soil is wet without the need for it to be flooded, so they don't have the problem of flooding the bottom dishes in flowerpots if the pipe is not deep enough. The idea of using humidity controls based on air passage is not new and started already from U.S. Pat. No. 3,758,987 in 1973, however to the best of our knowledge it has not been used while combining separate controls for multiple plants joined together with a single source tank, and also no-return valves were not used in this context since there was no need for them, and also to the best of out knowledge this has not been used in the context of dropper irrigation pipe networks. Another possible variation, for example in large gardens or in fields, is to use (preferably in combination with the variation of the hierarchy of more than two levels) more than one such common tank, so that for example there is one main tank, but for example there are additional intermediary junctures that also have such a common tank for the sub-group of areas (or plants) that they control. Each such tank or juncture preferably also has a no-return valve, so that preferably for example breaches in any side-pipe or container will preferably only have local effects. Another possible variation is that each side-channel has its own preferably small or even miniature air-tight tank (for example just the size of a small syringe or even smaller), each for example with it's small Niagara-like floating arm (which for example moves a small low-pressure valve or more preferably presses against a flexible for example Silicon pipe), in a way similar to the variation of using a small Niagara-tank for each plant, except that the moisture control is based on allowing air to enter only when the soil is not wet. Such small tanks may be even mass-produced as an integrated part of the pipes. Preferably each such small-tank has also its own no-return valve. Such small tanks might work even without the valve (75) at the exit of the tank since the water flow in the exit pipe is preferably low enough that its effect during the refilling of the tank is negligible. In fact, these small Niagara-like containers can be very similar to those shown in FIG. 6b. Of course, various combinations of the above and other variations are also possible.

While the invention has been described with respect to a limited number of embodiments, it will be appreciated that many variations, modifications, expansions and other applications of the invention may be made which are included within the scope of the present invention, as would be obvious to those skilled in the art.

We claim:

1. A system for efficient automatic irrigation, comprising:
at least one main pipe for connection to a source of water at high pressure;
a plurality of side channels branching off from said at least one main pipe for carrying water at considerably lower pressure compared to the main pipe;
a low pressure automatic valve disposed in each of said side channels for dispensing of water from a side channel in which the valve is disposed; and
a humidity sensor connected to each said automatic valve and disposed adjacent the valve, for controlling dispensing of water from the side channel in which the humidity sensor and the automatic valve are disposed;

wherein the low pressure automatic valve includes an asymmetric capillary material for achieving equilibrium between dispensed water supply and earth being watered when a desired level of humidity of the earth is reached, including at least one of:

an asymmetric capillary material based on an asymmetric shape of the pores of the capillary material;

an asymmetric capillary material having asymmetric pores that are narrower at a side adjacent the water supply than at a side adjacent the soil;

an asymmetric capillary material based on small capillary tubes which are narrower at a side adjacent the water supply;

an asymmetric capillary material having at least one of static negative charge or more oxygen on a side adjacent the water supply;

an asymmetric capillary material having V-shaped pores;

an asymmetric capillary material made from a gradient of different materials, so that the materials adjacent the water supply have higher capillarity;

an asymmetric capillary material based on materials which are more hydrophilic on a side adjacent the earth and more hydrophobic on a side adjacent the water supply;

an asymmetric capillary material which is at least one of asymmetric capillary carbon membrane, asymmetric polysulfone membrane, and asymmetric ceramic membrane;

asymmetric capillary materials inserted into a bottom of cut parts or plants that need to develop new roots and thus act as artificial roots, helping to nourish the plants until the plants develop their own real roots; and a plurality of asymmetric capillary materials with different degrees of asymmetry, so that various choices are used for various desired levels of humidity.

2. The system of claim 1, comprising means for lowering water pressure disposed between the main pipe and each of said side-channels, which is at least one means selected from the group consisting of:

a long twisted small conduit that lowers water flow;

a twisted small conduit with angles that are sharper than 90 degrees in order to increase efficiency;

a twisted small conduit exiting into a wider side-pipe;

a common water collector tank from which the side channels branch; and a mechanical pressure-reducer.

3. The system of claim 1, wherein the controlling of dispensing of water is accomplished by at least one of:

a mechanical humidity sensor that controls a mechanical valve;

a mechanical humidity sensor that exerts pressure directly on a flexible pipe;

a chemical humidity sensor based on behavior of water;

means that supply water to the earth and stop supplying the water to the earth when a certain humidity level is reached, automatically creating an equilibrium in water pressure with the earth; and a device which absorbs water into a container when the earth is wet, and dispenses the water in the container when the earth is dry, and the humidity sensor comprises an element that senses water level in the container.

4. The system of claim 1, additionally comprising at least one of:

at least one intermediate pipe at intermediate pressure disposed between the main pipe and a side channel;

at least one central control means for overriding the humidity sensors by issuing a command to force all the valves to at least one of closing and opening; and means for providing a burst of water pressure in order to help push away elements that might clog the small conduits during the slow flow of the water.

5. The system of claim 1, additionally comprising at least one of:

a manual override switch for releasing more or less water for given levels of humidity and changing the threshold of humidity that is considered sufficient; and at least one water-blocking material with walls therearound inserted into the earth at a certain distance below the plants, so as to create at least one large pool isolating the earth with the plants above that pool from the rest of the earth below and around.

6. The system of claim 1, wherein plants are disposed in flowerpots having a bottom dish in which a humidity sensor is disposed, additionally comprising at least one:

a humidity sensor that determines immersion in water;

means for watering the flowerpot by the humidity sensor directly controlling an adjacent valve on a pipe that enters or comes near to flowerpot soil from above so that the water goes through the soil from the top down before it reaches the bottom dish;

a water pipe dropping water directly into the bottom dish;

forming a bottom of the flowerpot of at least one of a fine mesh and another fine porous material, in order to further increase the ability of the water to climb from the bottom up into soil;

placing capillary materials at the bottom of the bottom dish that are stuck into at least one hole at the bottom of the flowerpot and up into soil in the flowerpot, in order to further facilitate the absorption of the water from below.

7. The system of claim 6, wherein the sensor is a mechanical sensor, the system comprises at least one of:

the mechanical sensor including a floating element connected to an arm that directly moves a mechanical valve;

the mechanical sensor including a floating element connected to an arm that directly exerts pressure on a flexible pipe when the element floats up;

the mechanical sensor controlling the valve on the water pipe by letting an arm of the sensor move a wire within a hard sleeve that is coupled to the side channel;

the mechanical sensor controlling a part of the side channel that is adjacent thereto, before the channel bends upwardly into the flowerpot from above.

8. The system of claim 6, wherein each bottom dish is shared by more than one flowerpot, the system comprising at least one of:

the bottom dish being shaped like a large bath;

the bottom dish being elongated;

the bottom dish having higher walls than a flowerpot dish;

one sensor controlling the entire shared dish;

each flowerpot having its own water supply directly into its soil;

only one water supply and one valve provided for the dish, so that automatically each plant that needs more water absorbs more water from the common pool into itself and therefore into its soil; and dishes which are covered on the top and have holes in the top part for inserting the flowerpots, so that less water is lost due to evaporation directly from the dish.

9. The system of claim 6, additionally comprising at least one of:
- a plurality of multi-pot dishes connected with side channels, so that one set of sensor and valve can provide water to more than one dish and the connected dishes are at approximately the same vertical level;
- a water absorbing material used to transfer water by capillary action between dishes that are not at the same vertical level; and
- a water supply also controlled by time control, so that the dishes are kept with water therein only for part of the time.

10. The system of claim 1, wherein the water supply is controlled by adding a material that behaves like a normal root at the edge of side channels, to counter-balance the water supply and reach equilibrium when soil becomes wet, additionally comprising at least one of:
- said material works by capillary action and is shaped like a root with branches;
- said material also creates by itself the lowering of water pressure at the side channels; and
- means for control of sensitivity by changing the water pressure.

11. The system of claim 1, wherein multiple plants are irrigated by using a common air-tight water tank that is automatically refilled when the water therein drops below a predetermined level, and during refilling a water outlet therein is blocked, and additionally comprising at least one of:
- at least one main pipe leading from the common tank to the plants, and each side branch goes into soil and has a humidity control based on air passage, so that water is released into the soil from the common tank only when the soil is dry enough for air to enter the side branch bottom;
- in order to avoid flooding from higher side-channels to lower side channels, each-side pipe has a unidirectional no-return valve, so that no water can go back up, but air can go up;
- more than one common tank is present, so that there are additional intermediary junctures that also have such a common tank for a sub-group of plants that is controlled;
- each tank has a no-return valve, so that breaches in any pipe will only have local effects; and
- each side channel has its own small air-tight tank.

12. The system of claim 1, wherein problems of at least one of flooding and blockages are automatically detected, and said automatic detection is done by at least one of:
- means for allowing at least one of the valves and sensors at the side channels to report back to a central unit at least one of an approximate amount of water passed by therethrough, a percent of time the valve is open, determining substantially more humidity in a certain area, and finding that the area remains dry despite the attempts of the sensor to open the valve; and
- means for using a hierarchy of more than 2 levels and allowing intermediary junctures to report back to a central unit at least one of an approximate amount of water passed therethrough, and means for finding substantially more humidity in a certain area or much less humidity in a certain area.

13. The system of claim 1, wherein low pressure side channels end in a widening shape with a closed bottom water container and/or in a container with a floating valve, and out of said container capillary materials are in contact with the ground, the system comprising at least one of:
- capillary materials shaped like at least one of strings and roots;
- capillary materials going in an upward direction above the container, so that the earth has to suck the water in a direction against gravity;
- a container shaped like a cone, and a floating element inside the cone which is wider than the pipe, and which blocks the water passage when the cone is full;
- at least part of the capillary material going upward and covered with a non-porous material therealong, so that the water indeed must climb up first without being sucked by the earth along the way;
- a container is at a lower part being at least one of conic and elongated, so that it can be easily inserted into the ground; and
- a container having a sharp edge on the bottom, so that it can be easily inserted into the ground.

14. The system of claim 1, comprising at least one of:
- a very strong capillary element that has capillary strength much higher than the earth disposed between the water supply and the earth;
- at least two solid plates that are parallel to each other at a very close distance, with a strong capillary force therebetween;
- a capillary material with strong pressure at least on part thereof;
- a capillary material between the earth and the water supply sufficiently long to allow capillary forces to have more dominant effect;
- a capillary material which is spiral shaped in a direction opposite to the normal direction of a water vortex; and
- irregular capillary material, with at least one part thereof is pressed in a way that makes its capillary strength higher.

15. The system of claim 1, wherein the humidity sensor is a mechanical sensor, comprising at least one of:
- a material which extracts or expands when wet, which moves a valve or exerts direct pressure on a flexible pipe;
- a lever for changing amount of movement generated; and
- a capillary material that becomes heavier when absorbing water from the earth, which has enough free movement to affect at least one of a scale and a lever, which then moves a valve or exerts pressure directly on a flexible pipe.

16. The system of claim 15, wherein the mechanical sensor comprises a bi-material or multi-material of two or more materials with different expansion coefficients in response to water or humidity is used, so that the differential of expansion between said materials causes the bi- or multi-material to change shape, and comprising at least one of:
- one of said bi- or multi-material which expands when wet, and another of said bi- or multi-material which contracts or expands less when wet;
- said bi-material or multi-material in the shape of at least two thin strips, at least one of which moves a valve and exerts pressure on a flexible pipe;
- said bi-material or multi-material in the shape of at least two thin strips, at least one of which moves a valve and exerts pressure on a flexible pipe, and said strips are twisted into a helical shape, bent into half a circle or shape that translates the difference in expansions into a clear linear movement;

said bi-material or multi-material forms a controller device that is part of a dripper button which also contains the bi-material or multi-material sensor-controller;

said bi-material or multi-material forms a sensor-controller device that is mounted on an existing dripper buttons; and part of said bi-material or multi-material stuck in the ground and a part that applies pressure to a flexible pipe or moves a valve is above the ground.

* * * * *